(12) United States Patent
Omori

(10) Patent No.: US 8,644,633 B2
(45) Date of Patent: Feb. 4, 2014

(54) SCAN CONVERSION APPARATUS, IMAGE ENCODING APPARATUS, AND METHODS OF CONTROLLING THEM

(75) Inventor: Yuji Omori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 13/142,272

(22) PCT Filed: Mar. 2, 2010

(86) PCT No.: PCT/JP2010/053713
§ 371 (c)(1),
(2), (4) Date: Jun. 24, 2011

(87) PCT Pub. No.: WO2010/106931
PCT Pub. Date: Sep. 23, 2010

(65) Prior Publication Data
US 2011/0255799 A1 Oct. 20, 2011

(30) Foreign Application Priority Data
Mar. 19, 2009 (JP) .................................. 2009-069012

(51) Int. Cl.
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl.
USPC ..... 382/248; 382/250; 348/395.1; 348/403.1; 375/240.2

(58) Field of Classification Search
USPC .......................... 382/166, 232, 248, 250, 276; 348/395.1, 403.1–407.1; 375/240.18, 375/240.2
See application file for complete search history.

(56) References Cited

U.S. PATENT DOCUMENTS 5,363,475 A * 11/1994 Baker et al. .................... 345/422
5,714,950 A 2/1998 Jeong et al. ...................... 341/67

(Continued)

FOREIGN PATENT DOCUMENTS

JP 04-504040 7/1992
JP 07-050836 2/1995

(Continued)

OTHER PUBLICATIONS

International Search Report dated Mar. 30, 2010, in counterpart International Application No. PCT/JP2010/053713.

(Continued)

*Primary Examiner* — Yubin Hung
(74) *Attorney, Agent, or Firm* — Fitzpatrick, Cella, Harper & Scinto

(57) ABSTRACT

Using scan conversion processing of changing the scan order for each block, parallel scan conversion processing is executed if possible. A scan status holding unit holds statistical information based on the appearance frequency values of coefficients in a block. A scan order holding unit holds coefficient position information in which the coefficient positions in a block are arranged based on the scan order. A significant data position information generation unit scans one block data in accordance with coefficient position information, and generates information representing nonzero/zero for each data position. Based on the statistical information and the information generated by the significant data position information generation unit, a parallel number determination unit determines whether to process two blocks in parallel or process one block. In accordance with the determination, a scan conversion unit scan-converts two input blocks in parallel or scan-converts only one of the blocks.

15 Claims, 29 Drawing Sheets

(56) References Cited

U.S. PATENT DOCUMENTS

| | | |
|---|---|---|
| 6,426,975 B1 | 7/2002 | Nishi et al. ............... 375/240.13 |
| 6,961,474 B1 | 11/2005 | Hirano et al. .................. 382/246 |
| 7,382,925 B2 | 6/2008 | Boliek et al. .................. 382/233 |
| 7,593,961 B2 | 9/2009 | Eguchi et al. ............... 707/104.1 |
| 7,852,515 B2 | 12/2010 | Eschbach et al. ............ 358/3.28 |
| 7,904,187 B2 | 3/2011 | Hoffberg et al. ................. 700/83 |
| 8,279,942 B2 * | 10/2012 | Ito et al. ................... 375/240.26 |
| 8,315,686 B2 | 11/2012 | Llinas et al. .................. 600/378 |
| 2003/0128753 A1 | 7/2003 | Lee et al. ................... 375/240.2 |
| 2003/0185439 A1 | 10/2003 | Malvar ......................... 382/166 |
| 2003/0190085 A1 * | 10/2003 | Lin et al. ....................... 382/250 |
| 2004/0234141 A1 | 11/2004 | Christopoulos et al. ...... 382/233 |
| 2005/0100228 A1 | 5/2005 | Kitamura ...................... 382/232 |
| 2006/0146936 A1 | 7/2006 | Srinivasan ............... 375/240.18 |
| 2010/0246687 A1 * | 9/2010 | Yoshimatsu ............. 375/240.25 |
| 2011/0255798 A1 | 10/2011 | Fujino et al. .................. 382/248 |

FOREIGN PATENT DOCUMENTS

| | | |
|---|---|---|
| JP | 11-252338 | 9/1999 |
| JP | 2001-517905 | 10/2001 |
| JP | 2004-032788 | 1/2004 |
| JP | 2005-160021 | 6/2005 |
| JP | 2006-191628 | 7/2006 |
| JP | 2007-129612 | 5/2007 |
| WO | 91/11074 | 7/1991 |

OTHER PUBLICATIONS

U.S. Appl. No. 13/203,719 by Reiko Fujino, filed Aug. 26, 2011.

* cited by examiner

| / | 1 | 5 | 6 |
|---|---|---|---|
| 2 | 4 | 7 | 12 |
| 3 | 8 | 11 | 13 |
| 9 | 10 | 14 | 15 |

| / | 2 | 5 | 9 |
|---|---|---|---|
| 1 | 3 | 7 | 12 |
| 4 | 6 | 10 | 14 |
| 8 | 11 | 13 | 15 |

| / | 1 | 2 | 5 |
|---|---|---|---|
| 4 | 3 | 6 | 9 |
| 8 | 7 | 13 | 14 |
| 10 | 12 | 15 | 11 |

IMAGE      TILE      MB

FIG. 7A

| SCAN ORDER : n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| STATISTICAL INFORMATION : ScanTotals[ ] | 32 | 30 | 28 | 26 | 24 | 22 | 20 | 18 | 16 | 14 | 12 | 10 | 8 | 6 | 4 |

FIG. 7B

| SCAN ORDER : n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION : ScanOrder[ ] | d | a | e | h | b | i | f | l | e | j | m | g | n | k | o |

FIG. 16

● SIGNIFICANT COEFFICIENT POSITION

NO SIGNIFICANT COEFFICIENT

| SCAN ORDER | 1 | 2 | 3 | 4 | 5 | 6 | 7 | 8 | 9 | 10 | 11 | 12 | 13 | 14 | 15 |

SIGNIFICANT COEFFICIENT EXIST ONLY AT SCAN ORDER 1

| SCAN ORDER | ● | 2 | 3 | 4 | 5 | 6 | 7 | 8 | 9 | 10 | 11 | 12 | 13 | 14 | 15 |

SIGNIFICANT COEFFICIENTS EXIST ONLY AT SCAN ORDERS 1 AND 2

| SCAN ORDER | ● | ● | 3 | 4 | 5 | 6 | 7 | 8 | 9 | 10 | 11 | 12 | 13 | 14 | 15 |

SIGNIFICANT COEFFICIENTS EXIST ONLY AT SCAN ORDERS 1 TO 3

| SCAN ORDER | ● | ● | ● | 4 | 5 | 6 | 7 | 8 | 9 | 10 | 11 | 12 | 13 | 14 | 15 |

· · · · · ·

SIGNIFICANT COEFFICIENTS EXIST AT SCAN ORDERS 1 TO 14

| SCAN ORDER | ● | ● | ● | ● | ● | ● | ● | ● | ● | ● | ● | ● | ● | ● | 15 |

SIGNIFICANT COEFFICIENTS EXIST AT ALL SCAN ORDERS

| SCAN ORDER | ● | ● | ● | ● | ● | ● | ● | ● | ● | ● | ● | ● | ● | ● | ● |

F I G. 18A

- ● : POSITION OF SIGNIFICANT COEFFICIENT OF BLOCK INPUT #1
- ○ : POSITION OF SIGNIFICANT COEFFICIENT OF BLOCK INPUT #2

Term 1

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 30 | 28 | 26 | 24 | 22 | 20 | 18 | 16 | 14 | 12 | 10 | 8 | 6 | 4 |

⇨

Term 2

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 33 | 32 | 30 | 26 | 24 | 22 | 20 | 18 | 17 | 14 | 12 | 10 | 8 | 6 | 4 |

⇨

Term 3

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 33 | 33 | 31 | 26 | 25 | 23 | 20 | 18 | 17 | 14 | 12 | 10 | 8 | 6 | 4 |

⇨ TO FIG.18B

BLOCK INPUT #1 — Block A
BLOCK INPUT #2 — Block B

BLOCK INPUT #1 — Block C
BLOCK INPUT #2 — Block D

BLOCK INPUT #1 — Block D
BLOCK INPUT #2 — Block E

F I G. 18B

FROM FIG.18A

●: POSITION OF SIGNIFICANT COEFFICIENT OF BLOCK INPUT #1
○: POSITION OF SIGNIFICANT COEFFICIENT OF BLOCK INPUT #2

BLOCK INPUT#1

|   |   |   |   |
|---|---|---|---|
| ▨ | 3 | 1 | 0 |
| 2 | 7 | 0 | 0 |
| 0 | 0 | 0 | 0 |
| 0 | 0 | 0 | 0 |

Block F

BLOCK INPUT#2

|   |   |   |   |
|---|---|---|---|
| ▨ | 0 | 3 | 0 |
| 6 | 2 | 0 | 0 |
| 0 | 0 | 0 | 0 |
| 0 | 0 | 0 | 0 |

Block G

Term 4

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | a | d | e | h | b | i | f | l | c | j | m | g | n | k | o |
| STATISTICAL INFORMATION | 35 | 34 | 32 | 27 | 27 | 23 | 20 | 18 | 17 | 14 | 12 | 10 | 8 | 6 | 4 |

SCAN ORDER REPLACEMENT OCCURS

BLOCK INPUT#1

|   |   |   |   |
|---|---|---|---|
| ▨ | 0 | 3 | 0 |
| 6 | 2 | 0 | 0 |
| 0 | 0 | 0 | 0 |
| 0 | 0 | 0 | 0 |

Block G

BLOCK INPUT#2

|   |   |   |   |
|---|---|---|---|
| ▨ | 3 | 1 | 0 |
| 2 | 0 | 0 | 0 |
| 0 | 0 | 0 | 0 |
| 0 | 0 | 0 | 0 |

Block H

Term 5

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | a | d | e | b | h | i | f | l | c | j | m | g | n | k | o |
| STATISTICAL INFORMATION | 36 | 35 | 33 | 28 | 27 | 23 | 20 | 18 | 17 | 14 | 12 | 10 | 8 | 6 | 4 |

SCAN ORDER REPLACEMENT OCCURS

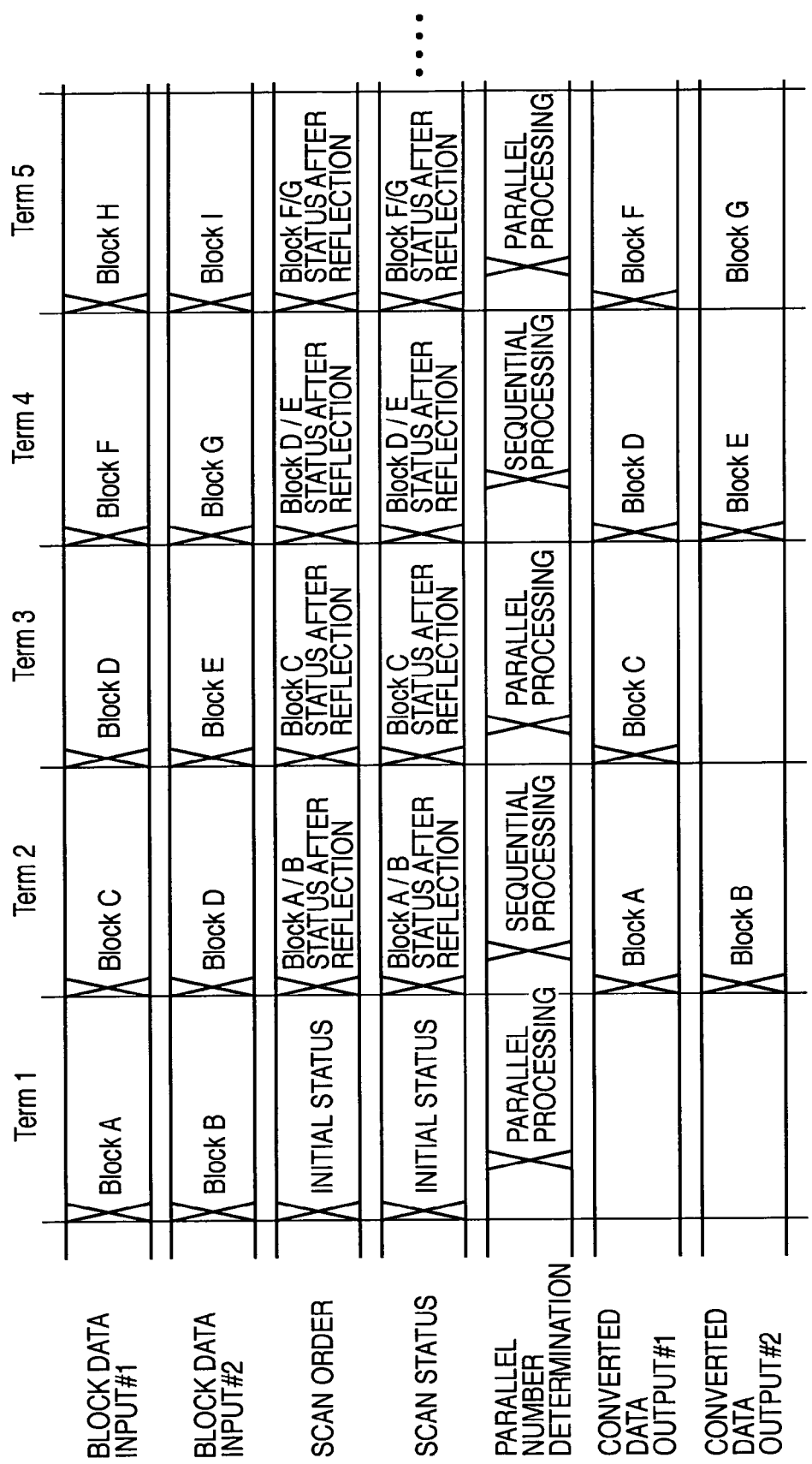

FIG. 23A

● : POSITION OF SIGNIFICANT COEFFICIENT OF BLOCK INPUT #1
○ : POSITION OF SIGNIFICANT COEFFICIENT OF BLOCK INPUT #2

Term 1

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 30 | 28 | 26 | 24 | 22 | 20 | 18 | 16 | 14 | 12 | 10 | 8 | 6 | 4 |

BLOCK INPUT #1

| | 0 | 1 | 0 |
|---|---|---|---|
| | 0 | 3 | 0 |
| | 0 | 0 | 0 |
| | 0 | 0 | 0 |

Block A

BLOCK INPUT #2

| | 0 | 0 | 0 |
|---|---|---|---|
| | 5 | 2 | 0 |
| | 0 | 0 | 0 |
| | 0 | 0 | 0 |

Block B

⇩ PORTION WHERE SCAN ORDERS REPLACE

Term 2

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 33 | 30 | 30 | 26 | 24 | 22 | 20 | 18 | 17 | 14 | 12 | 10 | 8 | 6 | 4 |

BLOCK INPUT #1

| | 0 | 1 | 0 |
|---|---|---|---|
| | 0 | 4 | 0 |
| | 0 | 9 | 0 |
| | 0 | 0 | 0 |

Block C

BLOCK INPUT #2

| | 0 | 0 | 0 |
|---|---|---|---|
| | 8 | 10 | 0 |
| | 0 | 1 | 0 |
| | 0 | 3 | 0 |

Block D

⇩ SCAN ORDER REPLACEMENT OCCURS

Term 3

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | e | a | h | b | i | f | l | c | j | m | g | n | k | o |
| STATISTICAL INFORMATION | 33 | 31 | 30 | 26 | 25 | 23 | 20 | 18 | 17 | 14 | 12 | 10 | 8 | 6 | 4 |

BLOCK INPUT #1

| | 0 | 0 | 0 |
|---|---|---|---|
| | 0 | 8 | 10 |
| | 0 | 1 | 0 |
| | 0 | 3 | 0 |

Block D

BLOCK INPUT #2

| | 0 | 0 | 0 |
|---|---|---|---|
| | 3 | 0 | 0 |
| | 0 | 0 | 0 |
| | 0 | 7 | 0 |

Block E

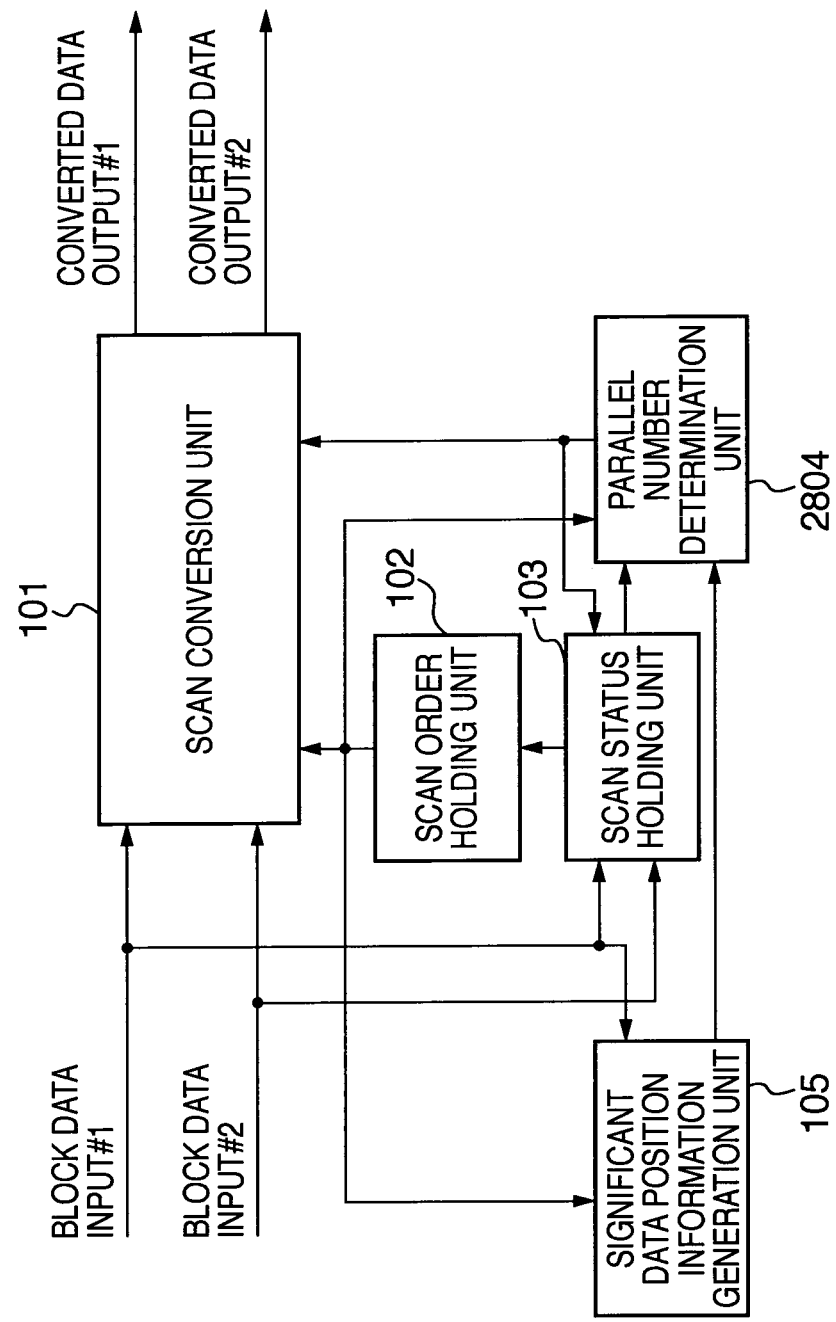

FIG. 26

| | Term 1 | Term 2 | Term 3 | Term 4 | Term 5 | Term 6 | Term 7 | |
|---|---|---|---|---|---|---|---|---|
| BLOCK DATA INPUT#1 | Block A | Block B | Block C | Block D | Block E | Block F | Block G | |
| BLOCK DATA INPUT#2 | Block B | Block C | Block D | Block E | Block F | Block G | Block H | |
| SCANNING ORDER | INITIAL STATUS | Block A STATUS AFTER REFLECTION | Block B STATUS AFTER REFLECTION | Block C STATUS AFTER REFLECTION | Block D STATUS AFTER REFLECTION | Block E STATUS AFTER REFLECTION | Block F STATUS AFTER REFLECTION | |
| SCAN STATUS | INITIAL STATUS | Block A STATUS AFTER REFLECTION | Block B STATUS AFTER REFLECTION | Block C STATUS AFTER REFLECTION | Block D STATUS AFTER REFLECTION | Block E STATUS AFTER REFLECTION | Block F STATUS AFTER REFLECTION | |
| SCAN CHANGE DETERMINATION | SEQUENTIAL PROCESSING | SEQUENTIAL PROCESSING | SEQUENTIAL PROCESSING | SEQUENTIAL PROCESSING | SEQUENTIAL PROCESSING | SEQUENTIAL PROCESSING | PARALLEL PROCESSING | |
| CONVERTED DATA OUTPUT#1 | | Block A | Block B | Block C | Block D | Block E | Block F | |
| CONVERTED DATA OUTPUT#2 | | | | | | | | |

FIG. 27A

●: POSITION OF SIGNIFICANT COEFFICIENT OF BLOCK INPUT #1
○: POSITION OF SIGNIFICANT COEFFICIENT OF BLOCK INPUT #2

Term 1

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 30 | 28 | 26 | 24 | 22 | 20 | 18 | 16 | 14 | 12 | 10 | 8 | 6 | 4 |

BLOCK INPUT#1: Block A
BLOCK INPUT#2: Block B

⇨

Term 2

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 31 | 29 | 26 | 24 | 22 | 20 | 18 | 16 | 14 | 12 | 10 | 8 | 6 | 4 |

BLOCK INPUT#1: Block B
BLOCK INPUT#2: Block C

⇨

Term 3

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 32 | 30 | 26 | 24 | 22 | 20 | 18 | 16 | 14 | 12 | 10 | 8 | 6 | 4 |

BLOCK INPUT#1: Block C
BLOCK INPUT#2: Block D

FROM FIG.27A

● : POSITION OF SIGNIFICANT COEFFICIENT OF BLOCK INPUT #1
○ : POSITION OF SIGNIFICANT COEFFICIENT OF BLOCK INPUT #2

Term 4

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 32 | 31 | 26 | 24 | 22 | 20 | 18 | 16 | 14 | 12 | 10 | 8 | 6 | 4 |

BLOCK INPUT#1 — Block D
BLOCK INPUT#2 — Block E

Term 5

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 32 | 32 | 26 | 24 | 22 | 20 | 18 | 16 | 14 | 12 | 10 | 8 | 6 | 4 |

BLOCK INPUT#1 — Block E
BLOCK INPUT#2 — Block F

FROM FIG.27B ⇨

● : POSITION OF SIGNIFICANT  ○ : POSITION OF SIGNIFICANT
COEFFICIENT OF BLOCK INPUT #1      COEFFICIENT OF BLOCK INPUT #2

Term 6

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | e | a | h | b | i | f | l | c | j | m | g | n | k | o |
| STATISTICAL INFORMATION | 32 | 33 | 32 | 26 | 24 | 22 | 20 | 18 | 16 | 14 | 12 | 10 | 8 | 6 | 4 |

NO REPLACEMENT OCCURS ALTHOUGH STATISTICAL INFORMATION IS SAME

BLOCK INPUT#1

| | 3 | 1 | 0 |
|---|---|---|---|
| | 8 | 2 | 0 | 0 |
| | 1 | 0 | 0 | 0 |
| | 0 | 0 | 0 | 0 |

Block F

BLOCK INPUT#2

| | 6 | 0 | 0 |
|---|---|---|---|
| | 3 | 5 | 0 | 0 |
| | 1 | 0 | 0 | 0 |
| | 0 | 0 | 0 | 0 |

Block G

Term 7

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | e | d | a | h | b | i | f | l | c | j | m | g | n | k | o |
| STATISTICAL INFORMATION | 34 | 33 | 33 | 27 | 25 | 22 | 20 | 18 | 16 | 14 | 12 | 10 | 8 | 6 | 4 |

NO REPLACEMENT OCCURS ALTHOUGH STATISTICAL INFORMATION IS SAME

BLOCK INPUT#1

| | 6 | 0 | 0 |
|---|---|---|---|
| | 3 | 5 | 0 | 0 |
| | 1 | 0 | 0 | 0 |
| | 0 | 0 | 0 | 0 |

Block G

BLOCK INPUT#2

| | 3 | 1 | 0 |
|---|---|---|---|
| | 2 | 0 | 0 | 0 |
| | 0 | 0 | 0 | 0 |
| | 0 | 0 | 0 | 0 |

Block H

SCAN CONVERSION APPARATUS, IMAGE ENCODING APPARATUS, AND METHODS OF CONTROLLING THEM

TECHNICAL FIELD

The present invention relates to a scan conversion apparatus, image encoding apparatus, and methods of controlling them.

BACKGROUND ART

Recent image data has a large data amount, and compression coding is effectively used to reduce the data amount. A general image encoding apparatus will be described below. As shown in FIG. 5, an image captured by an image sensing device or the like is divided into rectangular tiles each having a desired size. Each tile is further divided into two-dimensional MBs (macroblocks). Each MB data undergoes orthogonal transformation and is thus converted from color space data to transform coefficients in the frequency space. Quantization processing is also performed for the transform coefficients as needed. If the data pattern of the image extends across a plurality of blocks, intra-frame prediction is performed to obtain the quantized transform coefficients in accordance with the frequency bands, thereby further decreasing the strength of the transform coefficients. The two-dimensional transform coefficients that have undergone quantization and intra-frame prediction are sorted into one-dimensional data by continuously placing significant coefficients first and zero runs next. The sorted one-dimensional data is entropy-coded to generate a code stream. The code stream generated in the above-described way is reconstructed into an image in accordance with a reverse processing procedure.

Run-length encoding in JPEG or the like, one-dimensionally scans two-dimensional transform coefficients in accordance with a predetermined pattern, thereby encoding the lengths of continuous runs. FIG. 3A shows an example of the scan pattern. Scanning is performed in the illustrated numerical order. This is called a "zigzag" pattern because the numerical order indicates a zigzag route. However, a predetermined pattern such as the "zigzag" pattern does not necessarily contribute to the encoding efficiency due to the following three reasons. First, if conversion is performed across a plurality of blocks to suppress block distortion, the edge is enhanced, resulting in a larger transform coefficient variance and a higher transform coefficient strength. In this case, the strength of a low-frequency transform coefficient (the transform coefficient at the lower right corner of a block) does not always decrease. For this reason, the scan order for scanning transform coefficients from the upper left to the lower right of a block is not necessarily optimum. Second, when the pixels in a block have a dependence in the horizontal or vertical direction, the frequency bands of transform coefficients tend to localize in accordance with the dependence. In this case, a scan order that changes in the horizontal or vertical direction, as shown in FIG. 3B or 3C, is suitable. Third, if a texture exists across blocks, transform coefficients localize between the blocks in the same tendency. In this case, coefficient prediction is performed for the quantized transform coefficients, thereby suppressing the coefficient strength. The localization of the frequency bands of the transform coefficients changes depending on the prediction method. Hence, a scan pattern complying with the prediction method is necessary. For the above-described reasons, it is preferable to select an optimum scan order suitable for an input image and an encoding scheme (e.g., Japanese Patent Laid-Open No. 2004-032788).

A recent encoding scheme represented by JPEG-XR that is being standardized further divides each MB into blocks so as to change the quantized values or intra-frame prediction method in each block. In this scheme, the scan order is changed for each block (e.g., Japanese Patent Laid-Open Nos. 2006-191628 and 07-050836). For example, according to the scan order deciding method described in Japanese Patent Laid-Open No. 2006-191628, an MB including 16×16 pixels is divided into blocks each including 4×4 pixels, as shown in FIG. 4. Scan conversion of the blocks is performed in the order of A to P in FIG. 4. According to this method, the scan conversion result of the block A is analyzed, that is, the coefficients are analyzed in the order after sorting, thereby determining the scan order of the next block B. Similarly, the scan conversion result of the block B is analyzed, that is, the coefficients are analyzed in the order after sorting, thereby deciding the scan order of the next block C. In the same way, depending on the scan conversion result of the current process target block, the scan order of the next block is decided. The scan order deciding method will be described in more detail with reference to FIG. 6. First, in step S801, one transform coefficient C[n] (n≥0) is acquired in the one-dimensional order from a block that has undergone scan conversion. Next, in step S802, it is determined whether the coefficient C[n] acquired in step S801 is a run (zero). If the transform coefficient C[n] is a run, the process advances to determination in step S804. On the other hand, if the transform coefficient C[n] is a significant coefficient (nonzero), the process in step S803 is executed. There is a statistical information table ScanTotals which statistically obtains positions where significant coefficients are generated in a 4×4 block (e.g., FIG. 7A). FIG. 7A shows statistical information table values corresponding to the positions (e.g., FIG. 7B) in the 4×4 pixel block corresponding to the scan order, for the descriptive convenience. Note that the initial values of the statistical information ScanTotals are set as follows in some cases.

{t*N, t*(N−1), t*(N−2), . . . , t}

In general, a small integer (2 or 4) is selected as t. The value t may be decided by a quantization parameter used in quantization. Resetting the statistical information at a predetermined period enables to fix the maximum bit length of the elements of the statistical information. There also exists a table ScanOrder representing the correspondence between the scan order and the positions of coefficients in a 4×4 pixel block. The initial order of the coefficient positions ScanOrder corresponding to the scan order is preferably decided causally between an image encoding processing apparatus and an image decoding processing apparatus. For example, when coefficient prediction has been done in the horizontal direction, the scan order is initialized to the order of preferentially scanning in the horizontal direction (FIG. 3B). On the other hand, when coefficient prediction has been performed in the vertical direction, the scan order is initialized to the order of preferentially scanning in the vertical direction (FIG. 3C). Note that the scan order in the horizontal direction may also be used as the initial scan order of a block that does not exhibit any specific directivity. Each symbol from a to o in FIG. 4 indicates correspondence with a coefficient position in a given 4×4 pixel block shown in FIG. 4. Referring to FIG. 7B, the scan order table ScanOrder in the initialized status shown in FIG. 3B is represented by a to o in FIG. 4. For a significant coefficient, the appearance frequency value of the corresponding element in the statistical information table ScanTotals is incremented (increased) in step S803. In step S804, the two pieces of statistical information ScanTotals[n] and Scan- Totals[n−1] are compared. ScanTotals[n]>ScanTotals[n−1] means that the number of times of significant coefficient generation is larger at the position of the transform coefficient C[n] than at the position of a transform coefficient C[n−1]. Hence, in step S805, conversion processing is performed for the coefficient position ScanOrder corresponding to the scan order as shown in FIGS. 7A and 7B and ScanTotals corresponding to it. If the statistical information ScanTotals [n]≤ScanTotals[n−1] in step S804, the scan order change processing is not executed.

The conversion processing in step S805 will be described in detail. In the conversion processing, to replace the coefficient positions ScanOrder[n] and ScanOrder[n−1] with each other, for example, the following calculations are performed.

Temp=ScanOrder[$n$−1]

ScanOrder[$n$−1]=ScanOrder[$n$]

ScanOrder[n]=Temp

To replace the statistical information ScanTotals[n] and ScanTotals[n−1] with each other, for example, the following calculations are performed.

Temp=ScanTotals[$n$−1]

ScanTotals[$n$−1]=ScanTotals[$n$]

ScanTotals[n]=Temp

Upon determining in step S806 that transform coefficient acquisition in the block for scan order decision has not ended yet, the process advances to step S807 to prepare for acquisition of the next coefficient. If all coefficients in the block have been acquired, the scan order decision procedure ends.

As described above, the coefficient position ScanOrder[n−1] corresponding to the scan order n−1 is causally decided using the statistical information ScanTotals[n] and ScanTotals[n−1] corresponding to the scan orders n and n−1. This allows an optimum scan order stepwise to be decided. In addition, since the scan order can causally be decided, the encoding apparatus need not add, to the code stream, information to explicitly notify the decoding apparatus of the scan order.

As described above, in the scan order deciding method of deciding the scan order of a block based on the status of the preceding block, the scan order can change for each block. In such scan conversion processing, it is difficult to execute scan conversion of a plurality of blocks, and so the processing cannot be sufficiently speeded up.

DISCLOSURE OF INVENTION

The present invention provides a technique of solving the above-described problem. The present invention provides a technique of increasing the number of scan conversion target blocks per unit time by using scan conversion processing of changing the scan order for each block but parallelly executing the scan conversion processing whenever it is possible.

In order to solve the above-described problem, for example, the present invention in its first aspect provides a scan conversion apparatus for sorting data in a block having n rows×m columns based on a predetermined scan order, comprising: scan status holding means for updating and holding a current scan status in accordance with a status of the data in the block; scan order holding means for updating and holding a scan order in accordance with the scan status; significant data position information generation means for generating position information of significant data that exists in the block; parallel number determination means for instructing to perform scan conversion processing of N (N is an integer: N≥2) blocks as M-parallel processing (M is an integer: 1≤M≤N) in accordance with the position information output from the significant data position information generation means; and scan conversion means for sorting, in accordance with the instruction from the parallel number determination means, the data in the block based on the scan order held by the scan order holding means.

The present invention in its second aspect provides an image encoding apparatus comprising: image dividing means for dividing an image into unit blocks each having n rows×m columns; orthogonal transform means for performing orthogonal transform of each unit block output from the image dividing means and outputting transform coefficients; quantization means for quantizing the transform coefficients output from the orthogonal transform means and outputting quantized transform coefficients; parallel scan conversion means for sorting the quantized transform coefficients output from the quantization means in each unit block and outputting the quantized transform coefficients; and entropy encoding means for entropy-encoding the quantized transform coefficients output from the parallel scan conversion means and outputting a code stream, the parallel scan conversion means comprising: scan status holding means for updating and holding a current scan status in accordance with a status of the data in the block; scan order holding means for updating and holding a scan order in accordance with the scan status; significant data position information generation means for generating position information of significant data that exists in the block; parallel number determination means for instructing to perform scan conversion processing of N (N is an integer: N≥2) blocks as M-parallel processing (M is an integer: 1≤M≤N) in accordance with the position information output from the significant data position information generation means; and scan conversion means for sorting, in accordance with the instruction from the parallel number determination means, the data in the block based on the scan order held by the scan order holding means.

The present invention in its third aspect provides a method of controlling a scan conversion apparatus for sorting data in a block having n rows×m columns based on a predetermined scan order, comprising: a scan status holding step of updating and holding a current scan status in accordance with a status of the data in the block; a scan order holding step of updating and holding a scan order in accordance with the scan status; a significant data position information generation step of generating position information of significant data that exists in the block; a parallel number determination step of instructing to perform scan conversion processing of N (N is an integer: N≥2) blocks as M-parallel processing (M is an integer: 1≤M≤N) in accordance with the position information output in the significant data position information generation step; and a scan conversion step of sorting, in accordance with the instruction in the parallel number determination step, the data in the block based on the scan order held in the scan order holding step.

The present invention in its fourth aspect provides a method of controlling an image encoding apparatus, comprising: an image dividing step of dividing an image into unit blocks each having n rows×m columns; an orthogonal transform step of performing orthogonal transform of each unit block output in the image dividing step and outputting transform coefficients; a quantization step of quantizing the transform coefficients output in the orthogonal transform step and outputting quantized transform coefficients; a parallel scan conversion step of sorting the quantized transform coefficients output in the quantization step in each unit block and outputting the quantized transform coefficients; and an entropy encoding step of entropy-encoding the quantized transform coefficients output in the parallel scan conversion step and outputting a code stream, the parallel scan conversion step comprising: a scan status holding step of updating and holding a current scan status in accordance with a status of the data in the block; a scan order holding step of updating and holding a scan order in accordance with the scan status; a significant data position information generation step of generating position information of significant data that exists in the block; a parallel number determination step of instructing to perform scan conversion processing of N (N is an integer: N≥2) blocks as M-parallel processing (M is an integer: 1≤M≤N) in accordance with the position information output in the significant data position information generation step; and a scan conversion step of sorting, in accordance with the instruction in the parallel number determination step, the data in the block based on the scan order held in the scan order holding step.

The present invention in its fifth aspect provides a scan conversion apparatus which scans data in two-dimensionally arrayed blocks to convert the data into one-dimensionally arrayed data for run-length encoding, comprising: setting means for setting initial sorting information in which positions of data in the two-dimensional arrayed scan target blocks and statistical appearance frequency values of nonzero at the data positions are paired, and the pairs are arranged in descending order of appearance frequency value; a plurality of scan conversion means, each scan conversion means sequentially reading out and outputting the data in the two-dimensionally arrayed blocks in an order of data positions based on the sorting information, and if the readout data is nonzero, increasing the appearance frequency value at the position of the data; information generation means for scanning, based on the sorting information, data in blocks of two-dimensionally arrayed data that is a scan target of one of the plurality of scan conversion means, and generating information representing nonzero/zero for each data; and control means for controlling, based on the information generated by the information generation means and representing nonzero/zero, whether to allow execution of parallel processing of the plurality of scan conversion means.

The present invention in its sixth aspect provides an image encoding apparatus for encoding image data, comprising: dividing means for dividing encoding target image data into unit blocks each having m×n pixels; orthogonal transform means for performing orthogonal transform of each unit block divided by the dividing means and outputting transform coefficients; quantization means for quantizing the transform coefficients obtained by the orthogonal transform means; a scan conversion apparatus recited in the invention in its first aspect, which converts data of the unit block representing the quantized transform coefficients into one-dimensional data; and run-length encoding means for performing run-length encoding of the data obtained by the scan conversion apparatus and outputting the data.

The present invention in its seventh aspect provides a method of controlling a scan conversion apparatus which includes a plurality of scan conversion means, each scan conversion means sequentially reading out and outputting data in two-dimensionally arrayed blocks in an order of data positions based on sorting information, and if the readout data is nonzero, increasing an appearance frequency value at the position of the data, and scans the data in the two-dimensionally arrayed blocks to convert the data into one-dimensionally arrayed data for run-length encoding, comprising: a setting step of setting initial sorting information in which positions of data in the two-dimensional arrayed scan target blocks and statistical appearance frequency values of nonzero at the data positions are paired, and the pairs are arranged in descending order of appearance frequency value; an information generation step of scanning, based on the sorting information, data in blocks of two-dimensionally arrayed data that is a scan target of one of the plurality of scan conversion means, and generating information representing nonzero/zero for each data; and a control step of controlling, based on the information generated in the information generation step and representing nonzero/zero, whether to allow execution of parallel processing of the plurality of scan conversion means.

According to the present invention, it is possible to increase the number of scan conversion target blocks per unit time by using scan conversion processing of changing the scan order for each block but parallelly executing the scan conversion processing whenever it is possible.

Further features of the present invention will become apparent from the following description of exemplary embodiments with reference to the attached drawings.

BRIEF DESCRIPTION OF DRAWINGS

FIGS. 7A and 7B are views showing a statistical information table and a coefficient position table;

FIG. 16 is a view showing patterns without any change in the scan order;

FIGS. 18A and 18B are views showing the transition of the scan order (coefficient position) and statistical information;

FIG. 22 is a timing chart of an operation;

FIGS. 23A and 23B are views showing the transition of the scan order (coefficient position) and statistical information;

FIG. 24 is a block diagram showing the arrangement of a parallel scan conversion unit;

FIG. 26 is a timing chart of an operation; and

FIGS. 27A to 27C are views showing the transition of the scan order (coefficient position) and statistical information.

BEST MODE FOR CARRYING OUT THE INVENTION

The embodiments of the present invention will now be described with reference to the accompanying drawings. Note that in the embodiments, an example will be described in which encoding is performed using a scan conversion apparatus which performs scan conversion processing of deciding the scan order of a block based on the status of the preceding block. In the example to be described below, an arrangement concerning encoding is used in a compression system mounted on a digital camera or digital camcoder. However, the scan conversion apparatus or image encoding apparatus need not always be mounted on a digital camera or camcoder. The encoding target may be image data read by an image scanner, and the input source can be of any type, as a matter of course.

Figure 9:
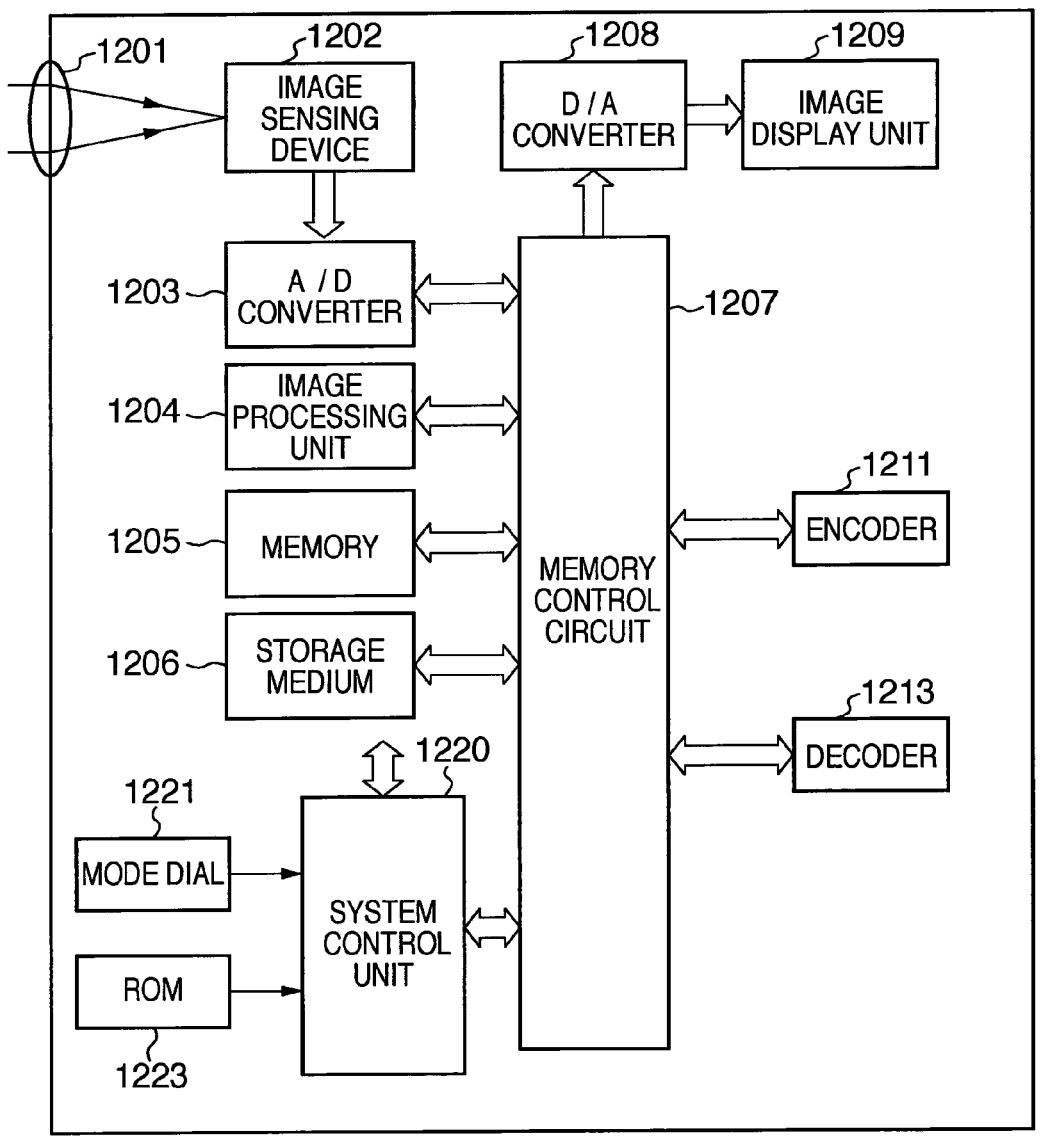
FIG. 9 is a block diagram showing the arrangement of a digital camera.

The hardware configuration of a digital camera serving as an image processing apparatus according to the embodiment will be described with reference to FIG. 9. A sensing target image is formed on an image sensing device 1202 such as a CCD or CMOS via a lens 1201. The image sensing device 1202 converts the formed image into an analog signal and outputs it to an A/D converter 1203 of the succeeding stage. The A/D converter 1203 converts the analog signal received from the image sensing device 1202 into a digital signal. A memory control circuit 1207 acquires the converted digital signal from the A/D converter 1203 as data (image data), and outputs the image data to an image processing unit 1204. The image processing unit 1204 executes known image interpolation processing and color conversion processing for the image data. The memory control circuit 1207 acquires the processed image data from the image processing unit 1204, and stores the acquired image data in a memory 1205. The memory 1205 is configured to temporarily store the data of a sensed still image or moving image, and has an area to store a predetermined number of still images (still images corresponding to a predetermined number of frames). The memory 1205 is read- and write-accessible. The memory control circuit 1207 therefore includes a plurality of memory controllers dedicated to data write in the memory 1205 and a plurality of memory controllers dedicated to data readout from the memory 1205. The memory control circuit 1207 reads out the image data from the memory 1205 again, and outputs it to a D/A converter 1208 and an encoder 1211. The D/A converter 1208 converts the image data into an analog signal, and outputs the converted analog signal to an image display unit 1209. The image display unit 1209 displays (reproduces), on its display screen, an image (sensed image) represented by the analog signal. On the other hand, the encoder 1211 generates a code stream (encoded data) from the image data (input image) received from the memory control circuit 1207. The memory control circuit 1207 records the code stream generated by the encoder 1211 in a storage medium 1206 as a file. A removable medium such as an SD card that is detachable from the image processing apparatus is used as the storage medium 1206.

The digital camera has various kinds of switches and buttons, including a mode dial 1221. The mode dial 1221 is used to select an image sensing mode or a reproduction mode. When the user selects the image sensing mode by operating the mode dial 1221, a system controller 1220 controls the operations of the processing units of the apparatus in accordance with a program stored in a ROM 1223, thereby implementing the above-described processing. More specifically, the system controller implements processing of causing the image display unit 1209 to display an image based on the data of an image obtained via the lens 1201, and also encoding the image data and recording it as a code stream in the storage medium 1206. If the user selects the reproduction mode by operating the mode dial 1221, the system controller 1220 controls the operations of the units of the image processing apparatus, thereby implementing each processing to be explained below.

The memory control circuit 1207 reads out a code stream from an encoded data file recorded in the storage medium 1206, and outputs the readout code stream to a decoder 1213. The decoder 1213 decodes the code stream received from the memory control circuit 1207. The memory control circuit 1207 outputs image data obtained by decoding to the D/A converter 1208. The D/A converter 1208 converts the image data into an analog signal, and outputs the converted analog signal to the image display unit 1209. The image display unit 1209 reproduces (displays), on its display screen, the encoded image data file stored in the storage medium 1206. Note that the ROM 1223 stores the setting data of the image processing apparatus and computer programs to be executed by the system controller 1220. The ROM 1223 also stores data to be described below as known data in the following processing. That is, the system controller 1220 executes processing using the computer programs and data stored in the ROM 1223, thereby controlling the operations of the units of the apparatus. The apparatus according to the embodiment thus implements each processing to be explained below.

Figure 2:
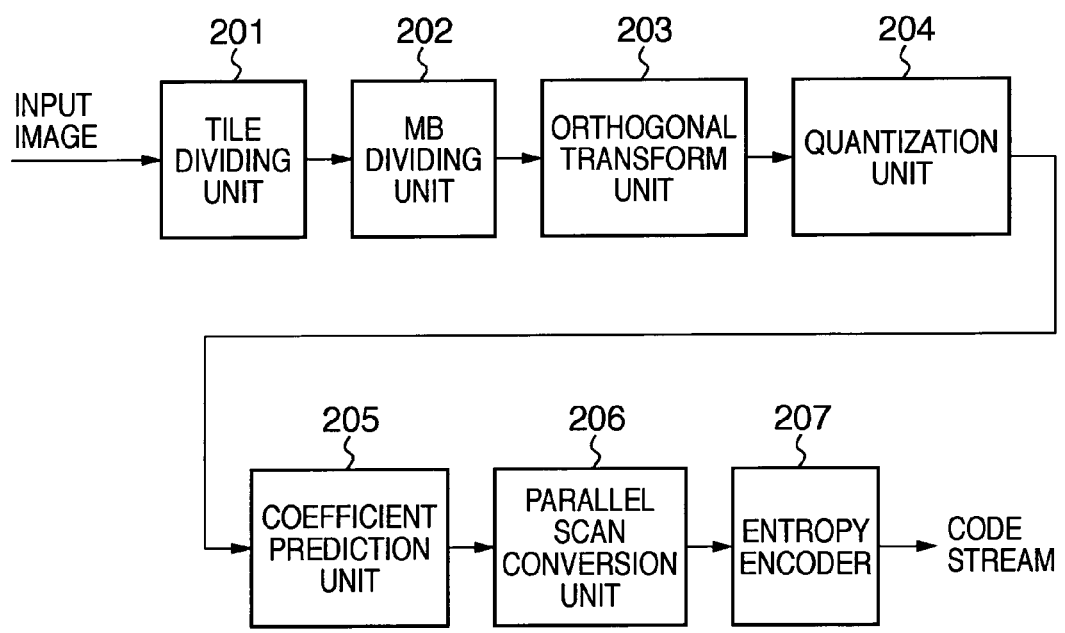
FIG. 2 is a block diagram showing the arrangement of an image encoder.
Figures 3A, 3B, 3C, 4:
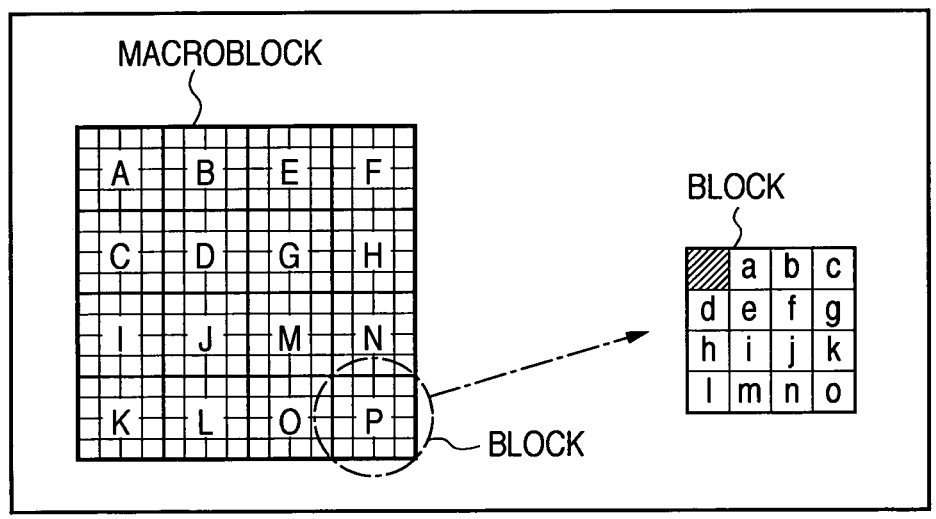
FIGS. 3A to 3C are views showing examples of a scan order.
FIG. 4 is a view showing the relationship between a macroblock and blocks and the correspondence relationship between each data in a block and a character assigned to its position.
Figure 5:
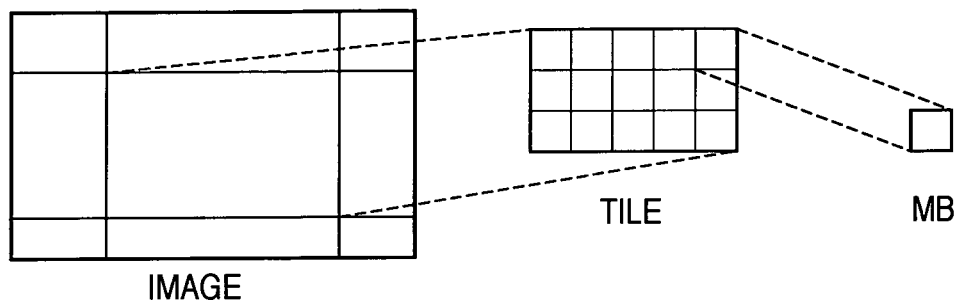
FIG. 5 is a view for explaining macroblocks.
Figure 8:
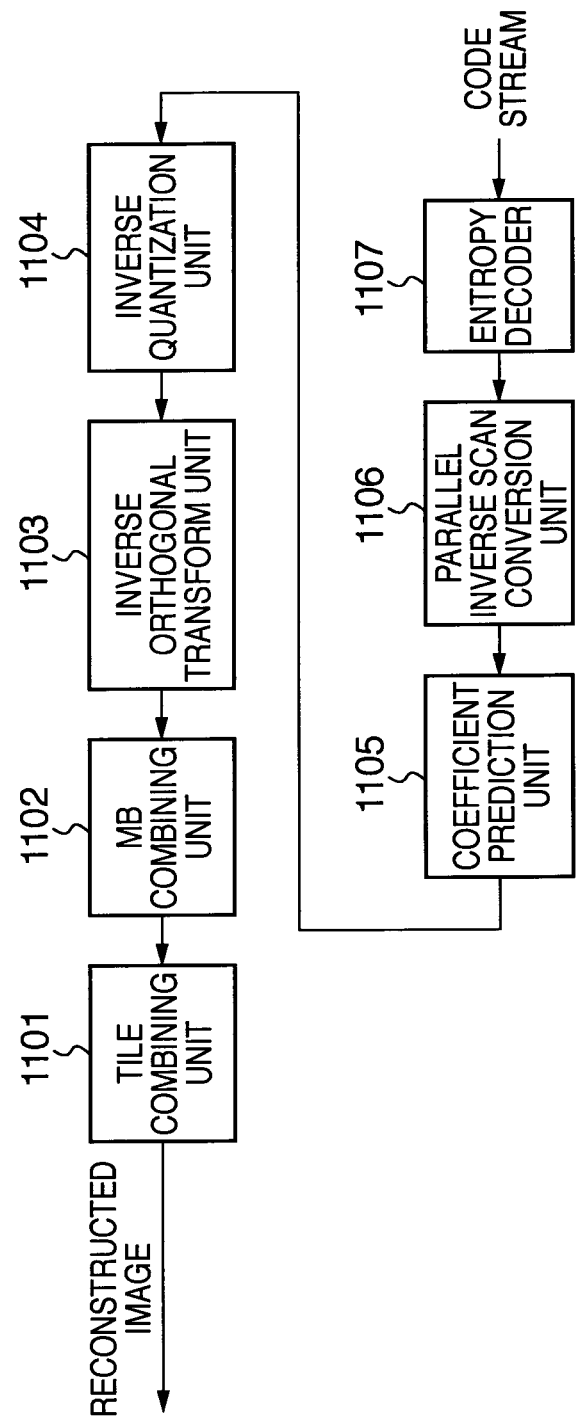
FIG. 8 is a block diagram showing the arrangement of an image decoder.

The arrangement and operation (processing) of the encoder 1211 will be described next with reference to FIG. 2. The units shown in FIG. 2 are hardware modules included in the encoder 1211. Some or all of them may be implemented by a computer program. A tile dividing unit 201 divides input image data into one or more tiles and sequentially outputs the tiles to an MB dividing unit 202. The MB dividing unit 202 divides one input tile into a plurality of macroblocks MBs each serving as a unit of encoding processing and including m×n pixels (two-dimensionally arrayed data), and outputs the divided MBs to an orthogonal transform unit 203. Hence, the processing units from the orthogonal transform unit 203 perform processing for each MB (macroblock). An encoding operation of encoding one MB will be described below. Note that the same operation is performed even for other MBs, and when all MBs in one tile have been processed, the same processing is executed for another tile. The data of an MB undergoes orthogonal transform of the orthogonal transform unit 203 and is thus converted from color space data to transform coefficients in the frequency space. To allow lossy conversion, a quantization unit 204 quantizes the transform coefficients to lower the resolution, thereby decreasing the data amount. If the data pattern of the image extends across a plurality of blocks, an intra-frame prediction unit 205 performs intra-frame prediction of the quantized transform coefficients (to be simply referred to as transform coefficients hereinafter) in accordance with each frequency band, thereby further decreasing the strength of the transform coefficients. However, when the quantized value changes depending on the coefficient position in a block or between blocks, the intra-frame prediction processing may be omitted even if the data pattern of the image extends across a plurality of blocks. The transform coefficients which have undergone quantization and intra-frame prediction are input to a parallel scan conversion unit 206 as two-dimensional data. The parallel scan conversion unit 206 scans the two-dimensional transform coefficients to sort them into one-dimensionally arrayed data that continuously contain significant coefficients first and zero runs next at a high probability. An entropy encoder 207 entropy-encodes (run-length encodes) the thus sorted one-dimensional data, thereby generating a code stream. The arrangement and operation (processing) of the decoder 1213 will be explained next with reference to FIG. 8. As shown in FIG. 8, the decoder 1213 includes an entropy decoder 1107, parallel inverse scan conversion unit 1106, coefficient prediction unit 1105, inverse quantization unit 1104, inverse orthogonal transform unit 1103, MB combining unit 1102, and tile combining unit 1101. The contents of processes of these processing units are reverse to those in the encoder 1211 shown in FIG. 2, and a detailed description thereof will be omitted. For the encoding scheme capable of changing the quantized value or intra-frame prediction method for each block, a method of changing the scan order for each block is suitable. Three embodiments will be explained below in detail, which implement the parallel scan conversion unit 206 for performing M-parallel scan conversion (M is an integer: 1≤M≤N) from N (N is an integer: N≥2) blocks to increase the process speed.

[First Embodiment]

Figure 1:
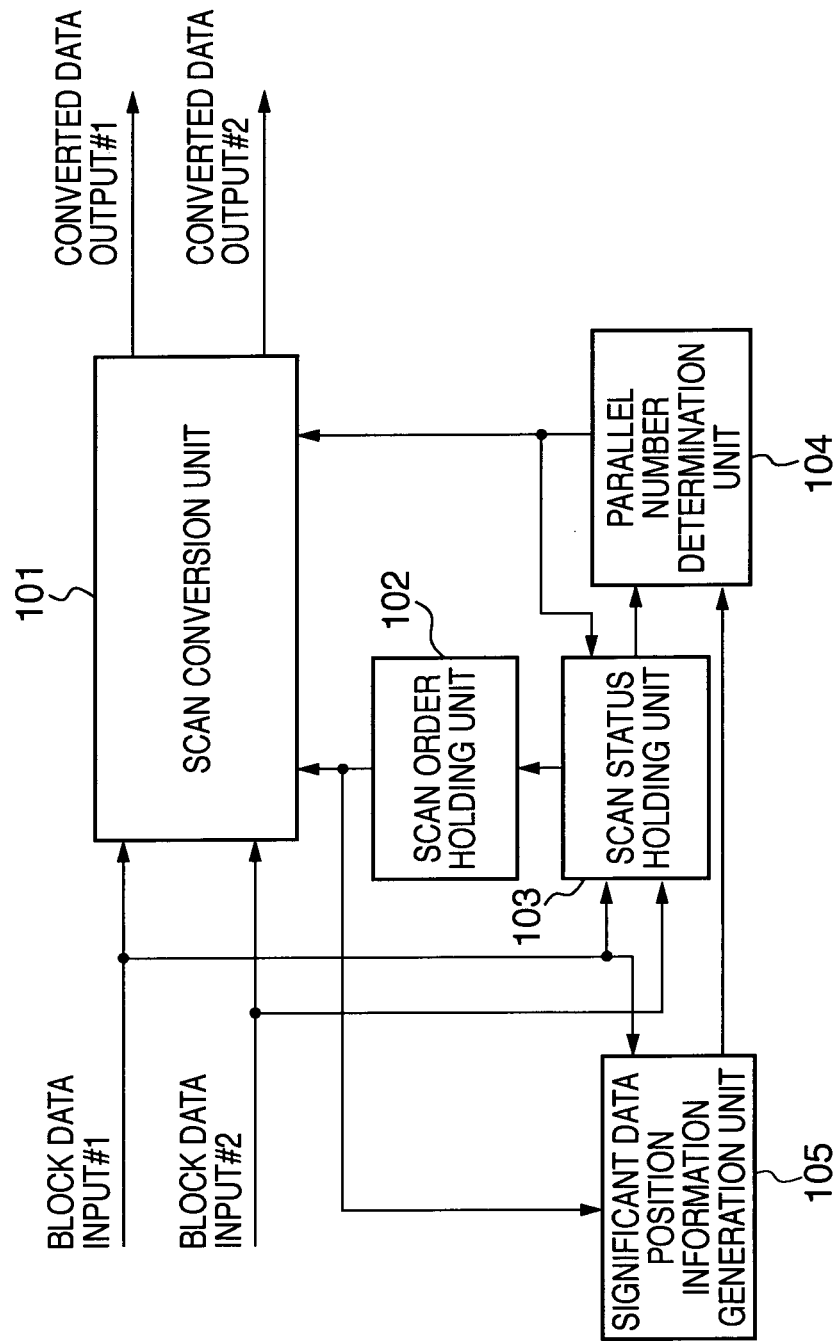
FIG. 1 is a block diagram showing the arrangement of a parallel scan conversion unit.

As shown in FIG. 1, a parallel scan conversion unit 206 includes a scan conversion unit 101, scan order holding unit 102, scan status holding unit 103, parallel number determination unit 104, and significant data position information generation unit 105. The scan conversion unit 101 is assumed to execute two scan conversion processes in parallel for the descriptive convenience. However, three or more scan conversion processes may be executed in parallel, as is apparent from the following explanation. The parallel scan conversion unit 206 will be described in detail with reference to FIG. 1.

The scan conversion unit 101 receives two consecutive block data inputs #1 and #2 (each having n rows×m columns), performs scan conversion (sort processing), and outputs converted data outputs #1 and #2. The scan conversion unit 101 executes scan conversion of block data inputs #1 and #2 in accordance with scan order information received from the scan order holding unit 102. The scan conversion unit 101 outputs only converted data output #1 or both of converted data outputs #1 and #2 in accordance with a parallel process control signal received from the parallel number determination unit 104. Based on information output from the scan status holding unit 103, the scan order holding unit 102 performs the above-described conversion processing as needed, and generates and holds scan order information representing the scan order. The scan order holding unit 102 outputs the generated scan order information to the scan conversion unit 101 and the significant data position information generation unit 105. The scan status holding unit 103 receives block data inputs #1 and #2, generates and holds a scan status and a next scan status, and outputs the next scan status to the scan order holding unit 102 and the scan status to the parallel number determination unit 104. The significant data position information generation unit 105 receives block data input #1 and the scan order information output from the scan order holding unit 102, arranges, based on the scan order, pieces of information each representing whether a coefficient is a significant coefficient (information representing nonzero/zero), and outputs the information to the parallel number determination unit 104 as significant data position information.

Figure 6:
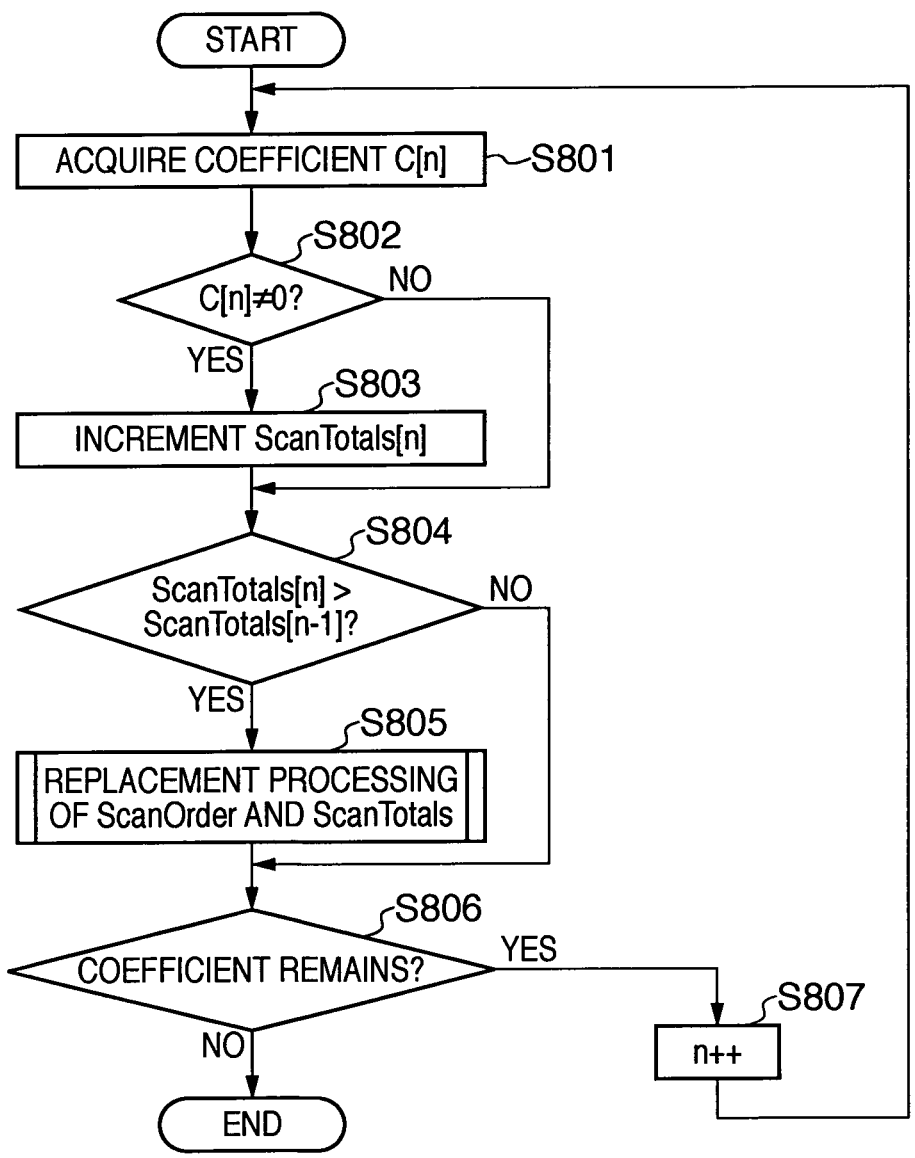
FIG. 6 is a flowchart of scan order decision processing.
Figure 17:
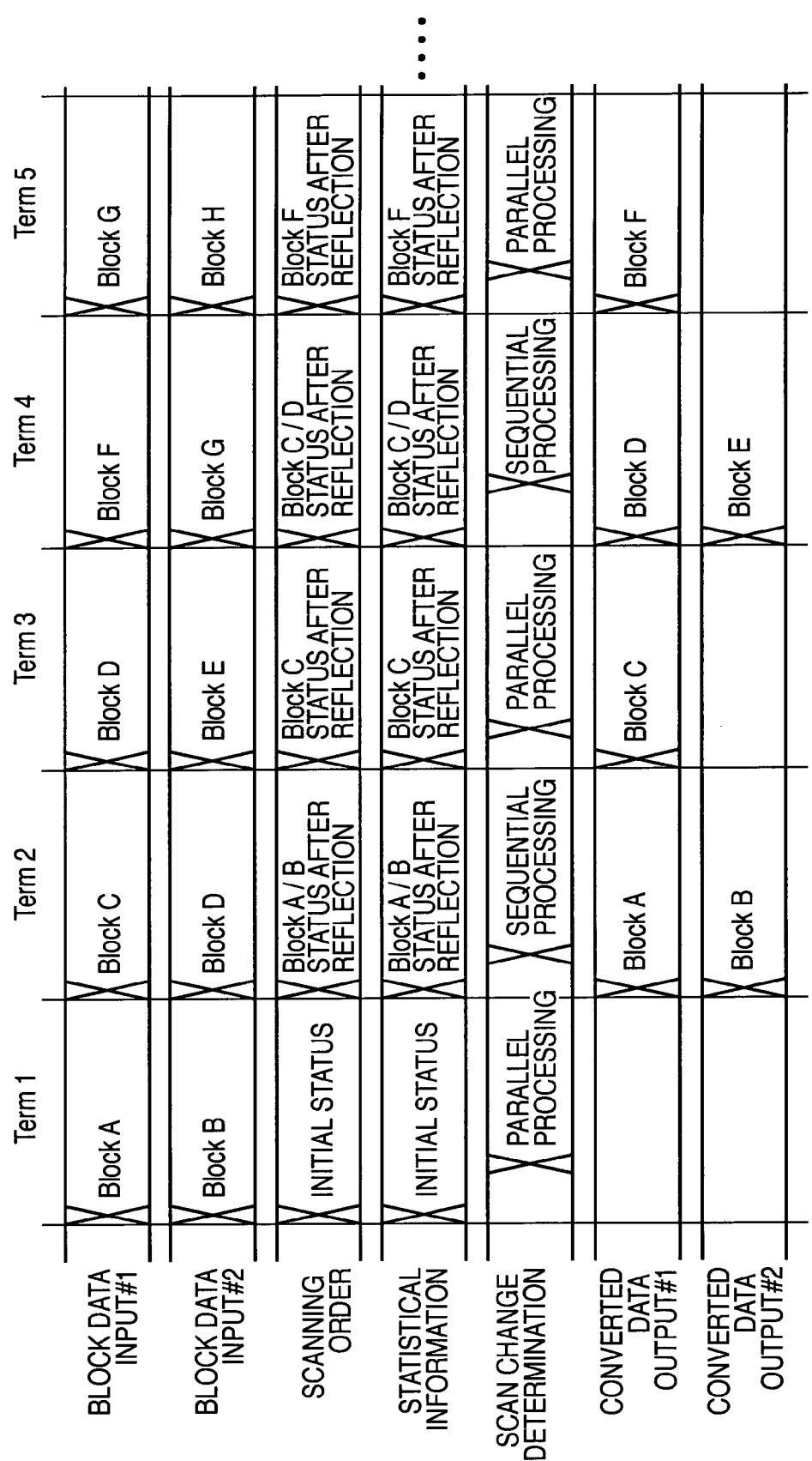
FIG. 17 is a timing chart of an operation.

The operation of the parallel scan conversion unit 206 according to this embodiment will be described next with reference to the timing chart of FIG. 17, the status explanatory views of FIGS. 18A and 18B, and FIG. 1. FIG. 17 shows changes in the statuses of the respective units from block data input to converted data output in periods of Terms 1 to 5. In Term 1, blocks A and B are supplied to each of the scan conversion unit 101 and the scan status holding unit 103 as block data inputs #1 and #2. In Term 1, the block A is also input to the significant data position information generation unit 105. In Term 1, the scan order information held in the scan order holding unit 102 and the scan status held in the scan status holding unit 103 are in the initial status. In this embodiment, the initial scan order information held in the scan order holding unit 102 represents the coefficient positions shown in FIG. 7B. However, the scan order information is not limited to this, and need only express the scan order. Similarly, in this embodiment, the initial scan status held in the scan status holding unit 103 is information that arranges statistically obtained appearance frequency values in descending order. The initial information held in the scan status holding unit 103 is assumed to be the information shown in FIG. 7A, for the descriptive convenience. The scan status is not limited to this and can be any other information to be used to decide the scan order. In this embodiment, the scan order and statistical information are decided based on the method of deciding the coefficient positions (ScanOrder) and statistical information (ScanTotals) shown in FIG. 6. However, the deciding method is not limited to this.

FIGS. 18A and 18B show the coefficient positions held in the scan order holding unit 102, the statistical information held in the scan status holding unit 103, and the statuses of block inputs #1 and #2 during the periods of Terms 1 to 5. In Term 1, the coefficient positions and statistical information are initialized as shown in FIG. 18A. Assume that the blocks A and B having values shown in FIGS. 18A and 18B are input. In FIGS. 18A and 18B, coefficient positions corresponding to significant coefficients (coefficients having values other than 0) appearing in the input blocks are marked with full circles and open circles for the purpose of reference. The full circles correspond to significant coefficient positions in block input #1. The open circles correspond to significant coefficient positions in block input #2. The significant data position information generation unit 105 also receives the scan order in the initial status from the scan order holding unit 102. The significant data position information generation unit 105 generates, based on the scan order, significant coefficient position information representing the positions of significant coefficients in the block A to be scanned.

FIG. 16 is a view showing examples of patterns of significant coefficient position information on which the parallel number determination unit 104 determines that parallel processing is possible. As can be seen, the patterns shown in FIG. 16 satisfy condition 1 or 2 below.

Condition 1: all scan target data in the block are zero.

Condition 2: nonzero exists at the scan start position according to sorting information, and a change from zero to nonzero never occurs up to the scan end position (significant data exist without interruption from a scan order i (i is an integer: 1≤i) to a scan order i+j (j is an integer: 0≤j) corresponding to position information, and no significant data exists from a scan order i+j+1).

If condition 2 is satisfied, i.e., if significant coefficients (nonzero) continuously exist in ascending order of scan order, no data position replacement can occur. It is therefore possible to determine to process block data inputs #1 and #2 in parallel. If no significant coefficients (nonzero) exist at all, as in condition 1, no data position replacement can occur. Hence, it is determined to perform parallel processing in this case as well. In this embodiment, since N=2, it is determined to execute 2-parallel processing. If significant data position information has a pattern other than those in FIG. 16, it is not determined to perform parallel processing. That is, the parallel number determination unit 104 functions as a controller that determines whether the scan conversion unit 101 can perform parallel scan.

Referring back to Term 1, in the significant coefficient position information of Term 1, the value of statistical information corresponding to each scan order never becomes larger than the value of statistical information corresponding to the preceding order. For this reason, both the blocks A and B can undergo scan conversion in the same scan order. Hence, based on the significant coefficient position information output from the significant data position information generation unit 105, the parallel number determination unit 104 determines that parallel processing is possible, and outputs a signal representing a parallel process instruction to the scan conversion unit 101 and the scan status holding unit 103. In Term 1, the scan conversion unit 101 sorts the scan orders of the input blocks A and B in accordance with the coefficient position information output from the scan order holding unit 102 and the parallel control signal output from the parallel number determination unit 104. In Term 1, the parallel control signal output from the parallel number determination unit 104 indicates parallel processing. Hence, the blocks A and B undergo sort processing in parallel in accordance with the coefficient position information output from the scan order holding unit 102.

In Term 2, blocks C and D are respectively input as block data input #1 and #2 to each of the scan conversion unit 101 and the scan status holding unit 103. The block C is input to the significant data position information generation unit 105 as block data input #1. Since parallel processing has been executed in Term 1, and the coefficients at the positions indicated by full and open circles in FIGS. 18A and 18B are significant coefficients, the pieces of statistical information at the corresponding positions in the scan status holding unit 103 are updated to values as indicated by Term 2 in FIG. 18A. Since replacement of coefficient positions has not occurred upon inputting the blocks A and B, the coefficient position information in the scan order holding unit 102 does not change in Term 2. In Term 2, the significant data position information generation unit 105 generates pieces of information each representing whether a coefficient in the block C is a significant coefficient, arranges them based on the scan order in accordance with the coefficient position information output from the scan order holding unit 102, and outputs the information to the parallel number determination unit 104 as significant data position information. Based on the significant data position information output from the significant data position information generation unit 105, the parallel number determination unit 104 outputs a parallel control signal to the scan conversion unit 101 and the scan status holding unit 103 in accordance with the criterion shown in FIG. 16. In Term 2, since the significant coefficient position information does not coincide with any pattern shown in FIG. 16, as indicated by Term 2 in FIG. 17, the parallel number determination unit 104 outputs a parallel control signal indicating sequential processing to the scan conversion unit 101 and the scan status holding unit 103. In Term 2, since the parallel control signal indicates sequential processing, the scan status holding unit 103 updates, out of the pieces of currently held statistical information, only information corresponding to the significant coefficients of the input block C, and outputs the information to the scan order holding unit 102 as the next statistical information. The positions corresponding to the significant coefficients of the input block C to be updated are indicated by full circles in Term 2 of FIG. 18A. The scan order holding unit 102 decides the coefficient position information using the statistical information in the next status output from the scan status holding unit 103. In Term 2, the scan conversion unit 101 outputs the results of scan conversion processing of the blocks A and B in Term 1 as converted data outputs #1 and #2. Since the parallel control signal output from the parallel number determination unit 104 indicates sequential processing, the scan conversion unit 101 sorts only the block C in accordance with the coefficient position information output from the scan order holding unit 102.

In Term 3, blocks D and E are respectively input as block data inputs #1 and #2 to each of the scan conversion unit 101 and the scan status holding unit 103. In Term 3, the block D is also input to the significant data position information generation unit 105. Since sequential processing has been executed in Term 2, and the coefficients at the positions indicated by full circles in FIG. 18A are significant coefficients of the block C, the pieces of statistical information at the corresponding positions in the scan status holding unit 103 are updated to values as indicated by Term 3 in FIG. 18A. Since replacement of coefficient positions has not occurred upon inputting the block C, the coefficient position information in the scan order holding unit 102 does not change in Term 3. In Term 3, the significant data position information generation unit 105 generates pieces of information each representing whether a coefficient in the block D is a significant coefficient, arranges them based on the scan order in accordance with the coefficient position information output from the scan order holding unit 102, and outputs the information to the parallel number determination unit 104 as significant coefficient position information. In Term 3, since the significant coefficient position information coincides with a pattern shown in FIG. 16, as indicated by Term 3 in FIG. 17, the parallel number determination unit 104 outputs a parallel control signal indicating parallel processing to the scan conversion unit 101 and the scan status holding unit 103. In Term 3, since the parallel control signal indicates parallel processing, the scan status holding unit 103 updates, out of the pieces of currently held statistical information, information corresponding to the significant coefficients of the input blocks D and E, and outputs the information to the scan order holding unit 102 as the next statistical information. The positions corresponding to the significant coefficients of the input blocks D and E to be updated are indicated by full and open circles in Term 3 of FIG. 18A. The scan order holding unit 102 decides the coefficient position information using the statistical information in the next status output from the scan status holding unit 103. In Term 3, the scan conversion unit 101 outputs the result of scan conversion processing of the block C in Term 2 as converted data output #1. The scan conversion unit 101 also holds the result of the scan conversion processing of the block B and outputs it as converted data output #2. Since the parallel control signal output from the parallel number determination unit 104 indicates parallel processing, the scan conversion unit 101 sorts the blocks D and E in parallel in accordance with the coefficient position information output from the scan order holding unit 102.

In Term 4, blocks F and G are respectively input as block data inputs #1 and #2 to each of the scan conversion unit 101 and the scan status holding unit 103. In Term 4, the block F is also input to the significant data position information generation unit 105. Since parallel processing has been executed in Term 3, and the coefficients at the positions indicated by full and open circles in FIGS. 18A and 18B are significant coefficients, the pieces of statistical information at the corresponding positions in the scan status holding unit 103 are updated to values as indicated by Term 4 in FIG. 18B. Since replacement of coefficient positions has occurred upon inputting the blocks D and E, the pieces of coefficient position information in the scan order holding unit 102 are updated, as indicated by Term 4 in FIG. 18B. In Term 4, the significant data position information generation unit 105 generates pieces of information each representing whether a coefficient in the block F is a significant coefficient, arranges them based on the scan order in accordance with the coefficient position information output from the scan order holding unit 102, and outputs the information to the parallel number determination unit 104 as significant coefficient position information. In Term 4, since the significant coefficient position information does not coincide with any pattern shown in FIG. 16, as indicated by Term 4 in FIG. 17, the parallel number determination unit 104 outputs a control signal indicating sequential processing to the scan conversion unit 101 and the scan status holding unit 103. In Term 4, since the parallel control signal indicates sequential processing, the scan status holding unit 103 updates, out of the pieces of currently held statistical information, only information corresponding to the significant coefficients of the input block F, and outputs the information to the scan order holding unit 102 as the next statistical information. The positions corresponding to the significant coefficients of the input block F to be updated are indicated by full circles in Term 4 of FIG. 18B. The scan order holding unit 102 decides the coefficient position information using the statistical information in the next status output from the scan status holding unit 103. In Term 4, the scan conversion unit 101 outputs the result of scan conversion processing of the block D in Term 3 as converted data output #1. Since the parallel control signal output from the parallel number determination unit 104 indicates sequential processing, the scan conversion unit 101 sorts only the block F in accordance with the coefficient position information output from the scan order holding unit 102.

In Term 5, blocks G and H are respectively input as block data #1 and #2 to each of the scan conversion unit 101 and the scan status holding unit 103. In Term 5, the block G is also input to the significant data position information generation unit 105. Since sequential processing has been executed in Term 4, and the coefficients at the positions indicated by full and open circles in FIG. 18B are significant coefficients, the pieces of statistical information at the corresponding positions in the scan status holding unit 103 are updated to values as indicated by Term 5 in FIG. 18B. Since replacement of coefficient positions has occurred upon inputting the block F, the pieces of coefficient position information in the scan order holding unit 102 are updated, as indicated by Term 5 in FIG. 18B. In Term 5, the significant data position information generation unit 105 generates pieces of information each representing whether a coefficient in the block G is a significant coefficient, arranges them based on the scan order in accordance with the coefficient position information output from the scan order holding unit 102, and outputs the information to the parallel number determination unit 104 as significant coefficient position information. In Term 5, since the significant coefficient position information does not coincide with any pattern shown in FIG. 16, as indicated by Term 5 in FIG. 17, the parallel number determination unit 104 outputs a parallel control signal indicating sequential processing to the scan conversion unit 101 and the scan status holding unit 103.

In Term 5, since the parallel control signal indicates sequential processing, the scan status holding unit 103 updates, out of the pieces of currently held statistical information, only information corresponding to the significant coefficients of the input block G, and outputs the information to the scan order holding unit 102 as the next statistical information. The positions corresponding to the significant coefficients of the input block G to be updated are indicated by full circles in Term 5 of FIG. 18B. The scan order holding unit 102 decides the coefficient position information using the statistical information in the next status output from the scan status holding unit 103. In Term 5, the scan conversion unit 101 outputs the result of scan conversion processing of the block F in Term 4 as converted data output #1. Since the parallel control signal output from the parallel number determination unit 104 indicates sequential processing, the scan conversion unit 101 sorts only the block G in accordance with the coefficient position information output from the scan order holding unit 102. The scan conversion processing is repeated in the same way.

Figure 10:
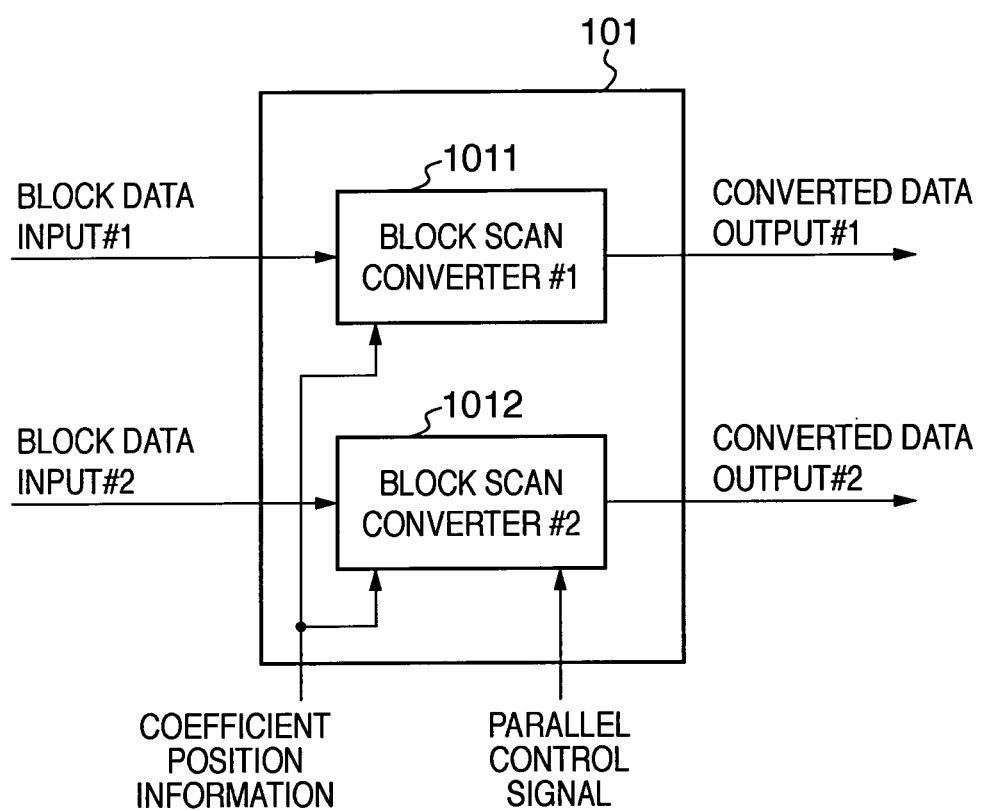
FIG. 10 is a block diagram showing the arrangement of a scan conversion unit.

The arrangements and operations of the units according to the embodiment will be described next. The internal arrangement and operation of the scan conversion unit 101 will be explained first with reference to FIG. 10. As shown in FIG. 10, the scan conversion unit 101 according to the embodiment assumes N=2 and therefore includes two block scan converters #1 1011 and #2 1012. The block scan converter #1 1011 sorts block data input #1 in accordance with the coefficient position information, and outputs the data as converted data output #1 in the next cycle. The block scan converter #2 1012 sorts block data input #2 in accordance with the coefficient position information and, if the parallel control signal indicates a parallel process instruction, outputs the data as converted data output #2 in the next cycle. If the parallel control signal indicates a sequential process instruction, the block scan converter #2 1012 holds the value in the preceding cycle and outputs it as converted data output #2.

Figure 11:
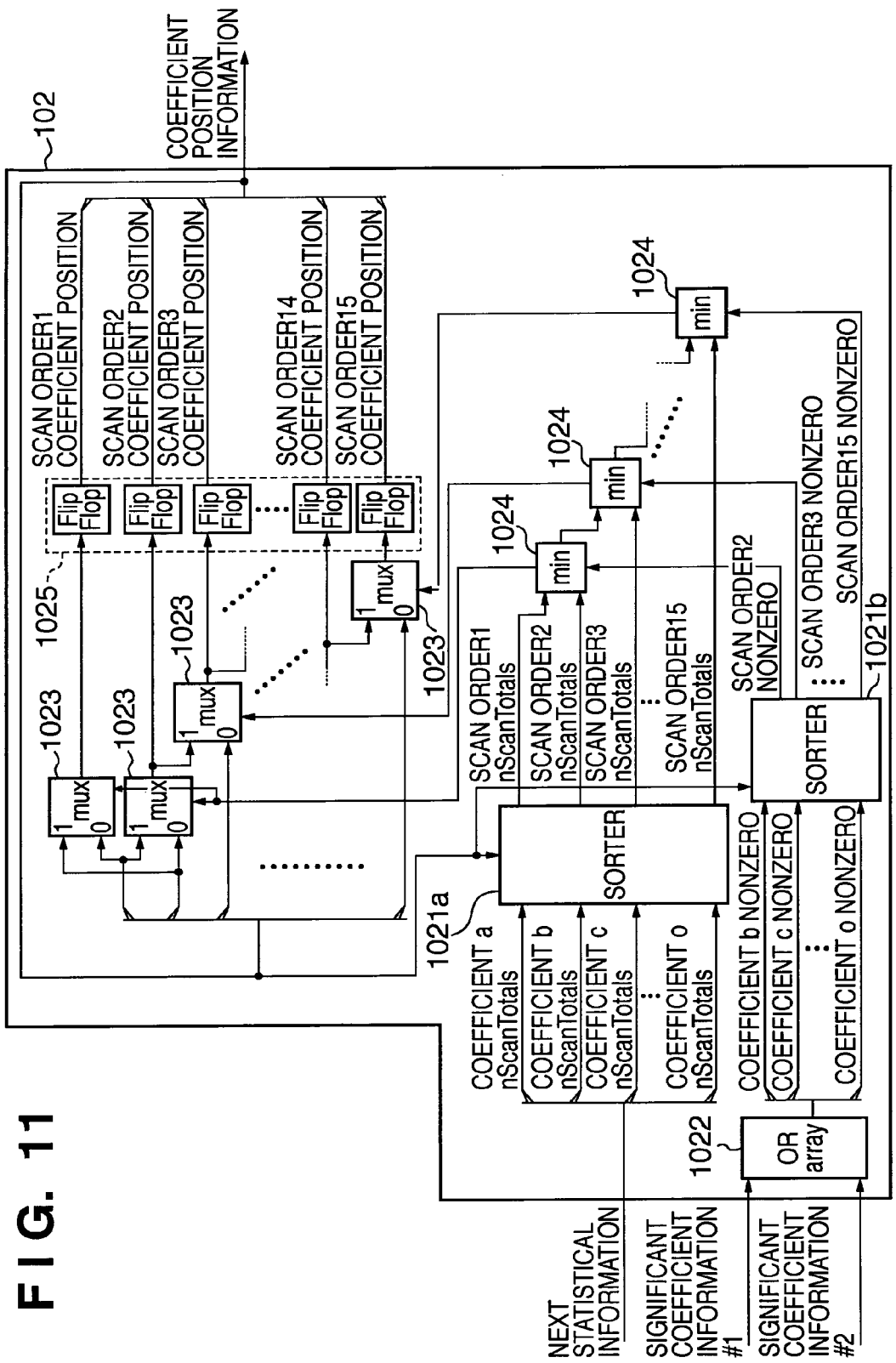
FIG. 11 is a block diagram showing the arrangement of a scan order holding unit.

The internal arrangement and operation of the scan order holding unit 102 will be described next with reference to FIG. 11. Referring to FIG. 11, a sorter 1021a sorts nScanTotals representing the next statistical information of coefficients a to o in accordance with the coefficient position information based on scan orders 1 to 15 and outputs the information. A sorter 1021b sorts nonzero information of the coefficients b to o in accordance with the coefficient position information based on scan orders 2 to 15 and outputs the information. A logic OR array 1022 logically ORs significant coefficient information #1 of the coefficients b to o and significant coefficient information #2 of the coefficients b to o, and outputs the nonzero information of the coefficients b to o. Each multiplexer 1023 selectively outputs one of inputs "1" and "0" in FIG. 11 in accordance with a selection signal. In this embodiment, when the selection signal is "1", input "1" is selected and output. When the selection signal is "0", input "0" is selected and output. If nonzero information output from the sorter 1021b indicates nonzero, a comparator 1024 receives, out of nScanTotals output from the sorter 1021a, two values adjacent in the scan order, and outputs a smaller one. If nonzero information output from the sorter 1021b does not indicate nonzero, the comparator 1024 outputs preceding nScanTotals in the scan order. If nonzero information output from the sorter 1021b indicates nonzero, and preceding nScanTotals in the scan order is small, the comparator 1024 outputs "1" as the selection signal to the multiplexer 1023. Otherwise, the comparator 1024 outputs "0". A flip-flop 1025 receives the outputs from the multiplexers 1023, and holds and outputs them as the coefficient position information of scan orders 1 to 15.

Figure 12:
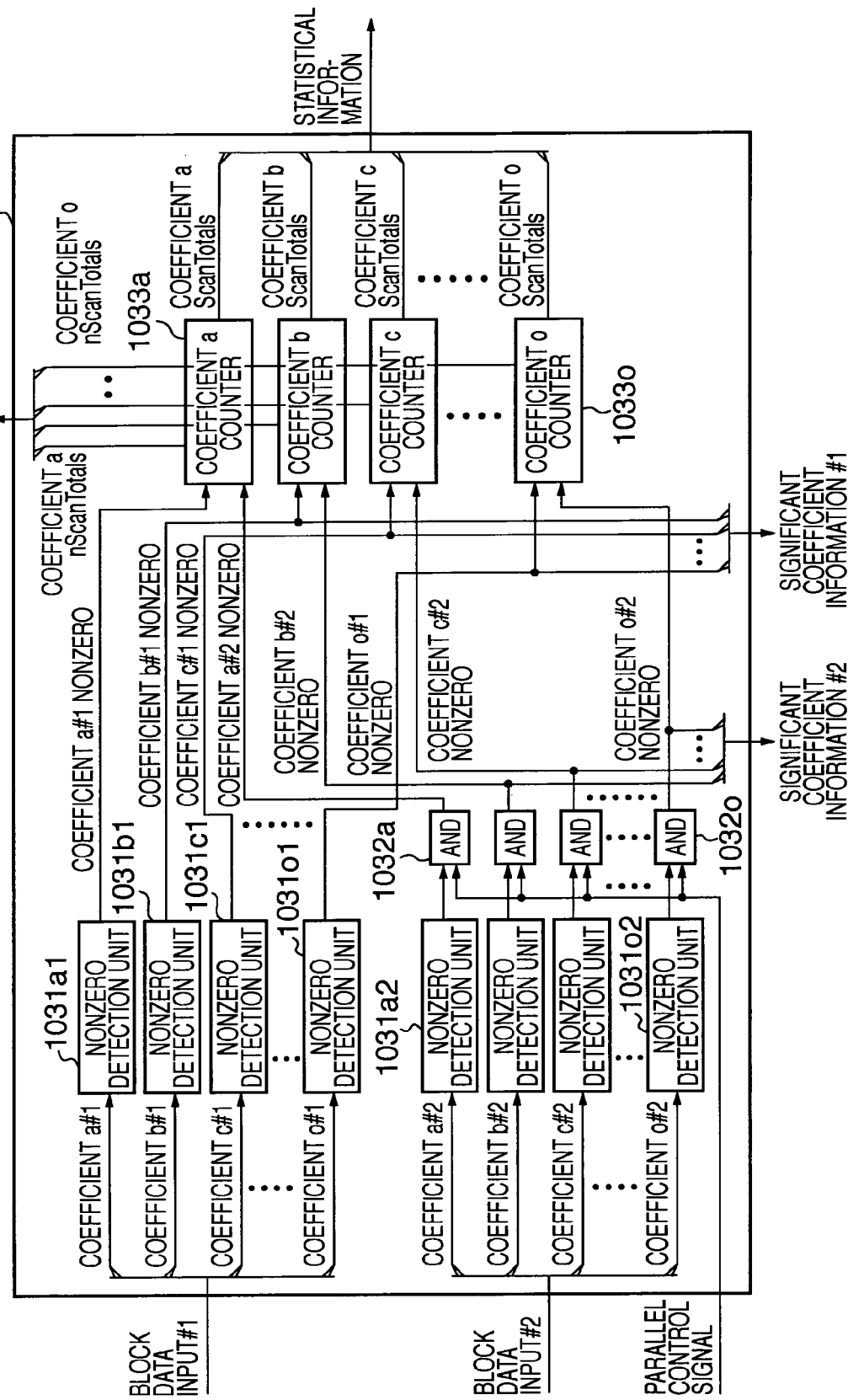
FIG. 12 is a block diagram showing the arrangement of a scan status holding unit.
Figure 13:
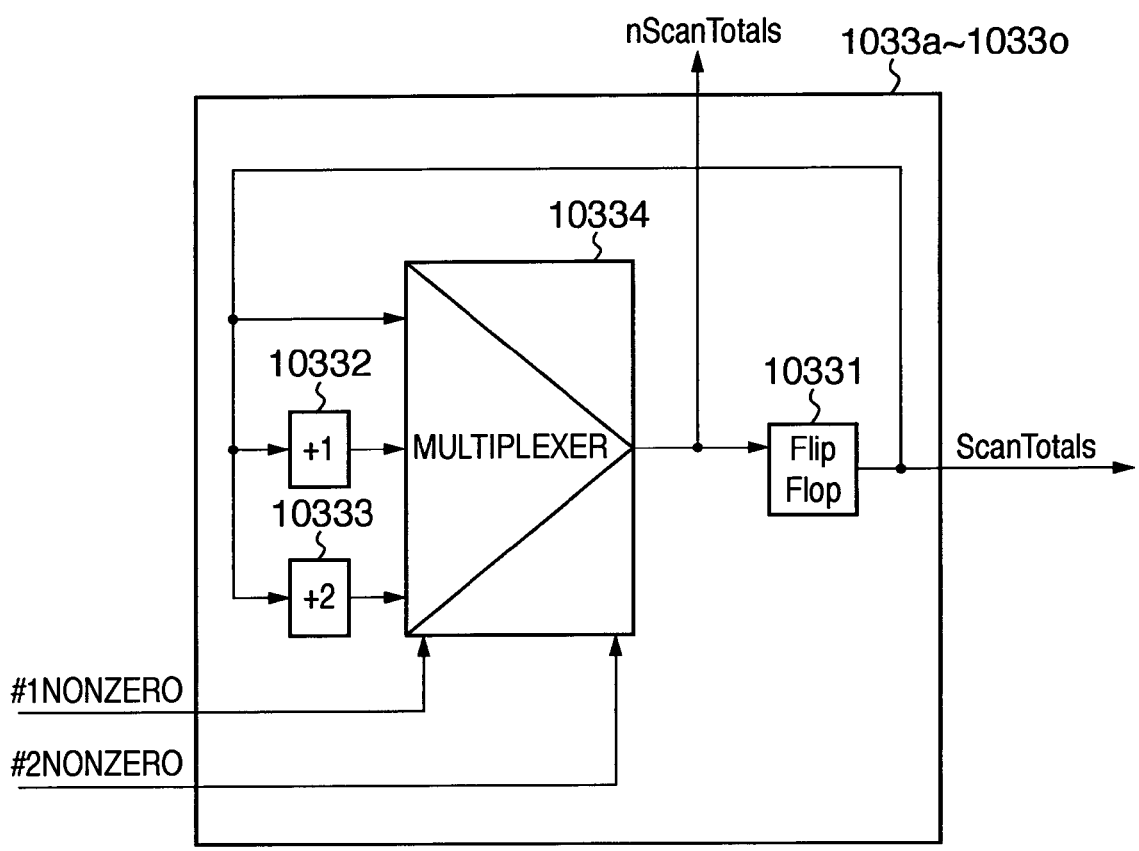
FIG. 13 is a block diagram showing the arrangement of a counter 1033 in FIG. 12.

The internal arrangement and operation of the scan status holding unit 103 will be described next with reference to FIG. 12. Referring to FIG. 12, block input data #1 and #2 are split into coefficients a #1 to o #1 and a #2 to o #2, and the coefficients are input to nonzero detection units 1031a1 to 1031o1 and 1031a2 to 1031o2, respectively. The nonzero detection units 1031a1 to 1031o1 determine whether the coefficients a #1 to o #1 are 0, respectively, and output the determination results as the nonzero signals of the coefficients a #1 to o #1. In this embodiment, "1" is output as a nonzero signal representing nonzero. Otherwise, "0" is output. The nonzero detection units 1031a2 to 1031o2 determine whether the coefficients a #2 to o #2 are 0, respectively, and output "1" for nonzero or "0" otherwise. Logic AND gates 1032a to 1032o logically AND the outputs from the nonzero detection units 1031a2 to 1031o2 and the input parallel control signal, and output the nonzero signals of the coefficients a #2 to o #2. In this embodiment, the parallel control signal indicates a parallel process instruction by "1" and a sequential process instruction by "0". More specifically, when the parallel control signal indicates a sequential process instruction, all the nonzero signals of the coefficients a #2 to o #2 are masked by "0". The nonzero signals of the coefficients a #1 to o #1 and the coefficients a #2 to o #2 are output to the outside as significant coefficient information #1 and #2, respectively. Counters 1033a to 1033o hold ScanTotals corresponding to the coefficients a to o, respectively. The counter 1033a receives the nonzero signals of the coefficients a #1 and a #2, counts up the internal status of each signal based on its status, and outputs ScanTotals. FIG. 13 is a block diagram showing an example of the internal arrangement common to the counters 1033a to 1033o. Referring to FIG. 13, a flip-flop 10331 holds and outputs ScanTotals of a corresponding coefficient. An adder 10332 adds "1" to the output from the flip-flop 10331 and outputs the addition result to a multiplexer 10334. An adder 10333 adds "2" to the output from the flip-flop 10331 and outputs the addition result to the multiplexer 10334. The multiplexer 10334 selectively outputs the output from the flip-flop 10331, the output from the adder 10332, or the output from the adder 10333 to the flip-flop 10331 in accordance with the statuses of #1 nonzero input and #2 nonzero input. The output from the multiplexer 10334 is output to the outside as "nScanTotals" as the next status of ScanTotals. When #1 nonzero input is "1", and #2 nonzero input is "0", the multiplexer 10334 selects and outputs the output from the adder 10332. When both inputs are "1", the multiplexer 10334 selects and outputs the output from the adder 10333. Otherwise, the multiplexer 10334 selects and outputs the output from the flip-flop 10331. Like the counter 1033a, the remaining counters 1033b to 1033o receive the nonzero signals of the coefficients b #1 to o #1 and the nonzero signals of the coefficients b #2 to o #2, respectively, count up the internal statuses of the signals based on their statuses, and output ScanTotals. ScanTotals of the coefficients a to o output from the counters 1033a to 1033o are output to the outside as the next statistical information. ScanTotals of the coefficients a to o output from the counters 1033a to 1033o are also output to the outside as the statistical information.

Figure 14:
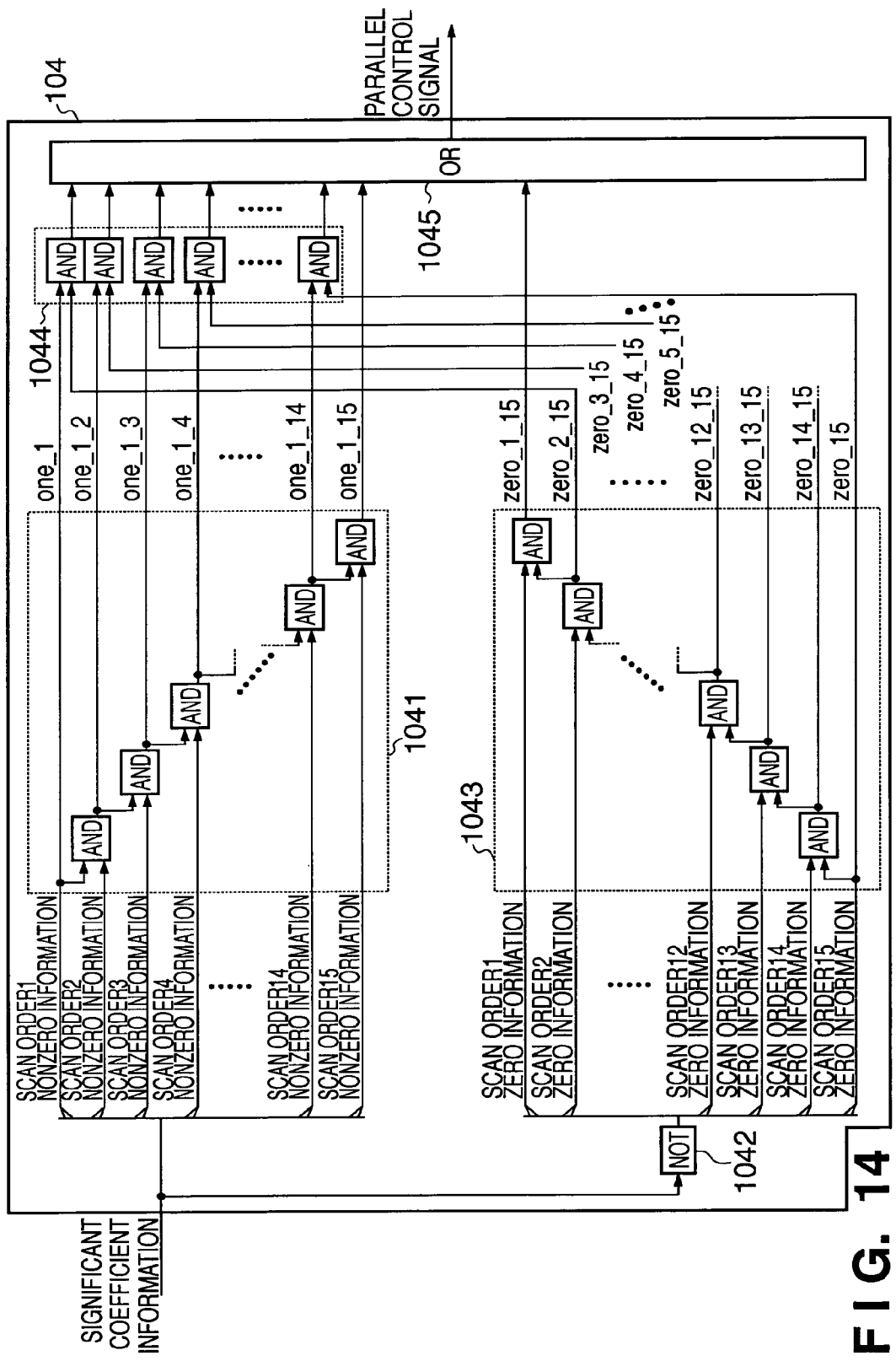
FIG. 14 is a block diagram showing the arrangement of a parallel number determination unit.

The internal arrangement and operation of the parallel number determination unit 104 will be described next with reference to FIG. 14. Referring to FIG. 14, significant coefficient information is input to a sorter 1041 and a logic NOT gate 1042. The significant coefficient information input to the sorter 1041 is split into nonzero information of scan orders 1 to 15. The sorter 1041 is formed from a logic AND array in which logic AND gates are connected as illustrated so as to receive the nonzero information of scan orders 1 to 15 and output one_1, one_1_2, one_1_3, . . . , one_1_15. The logic NOT gate 1042 logically inverts all pieces of significant coefficient information and outputs the information. The signal output from the logic NOT gate 1042 is split into zero information of scan orders 1 to 15 and input to a sorter 1043. The sorter 1043 is formed from logic AND gates connected as illustrated so as to receive the zero information of scan orders 1 to 15 and output zero_1_15, zero_2_15, zero_3_15, . . . , zero_14_15, and zero_15. A logic AND array 1044 receives the outputs from the sorters 1041 and 1043, logically ANDs them, and outputs signals to a logic OR gate 1045. The logic OR gate 1045 receives the outputs from the sorters 1041 and 1043 and the logic AND array 1044, logically ORs them, and outputs the results as a parallel control signal. With the above-described arrangement, the parallel number determination unit 104 detects whether significant coefficient information coincides with any significant coefficient pattern shown in FIG. 16. If the information coincides with a pattern, "1" is output as the parallel control signal. Otherwise, "0" is output.

Figure 15:
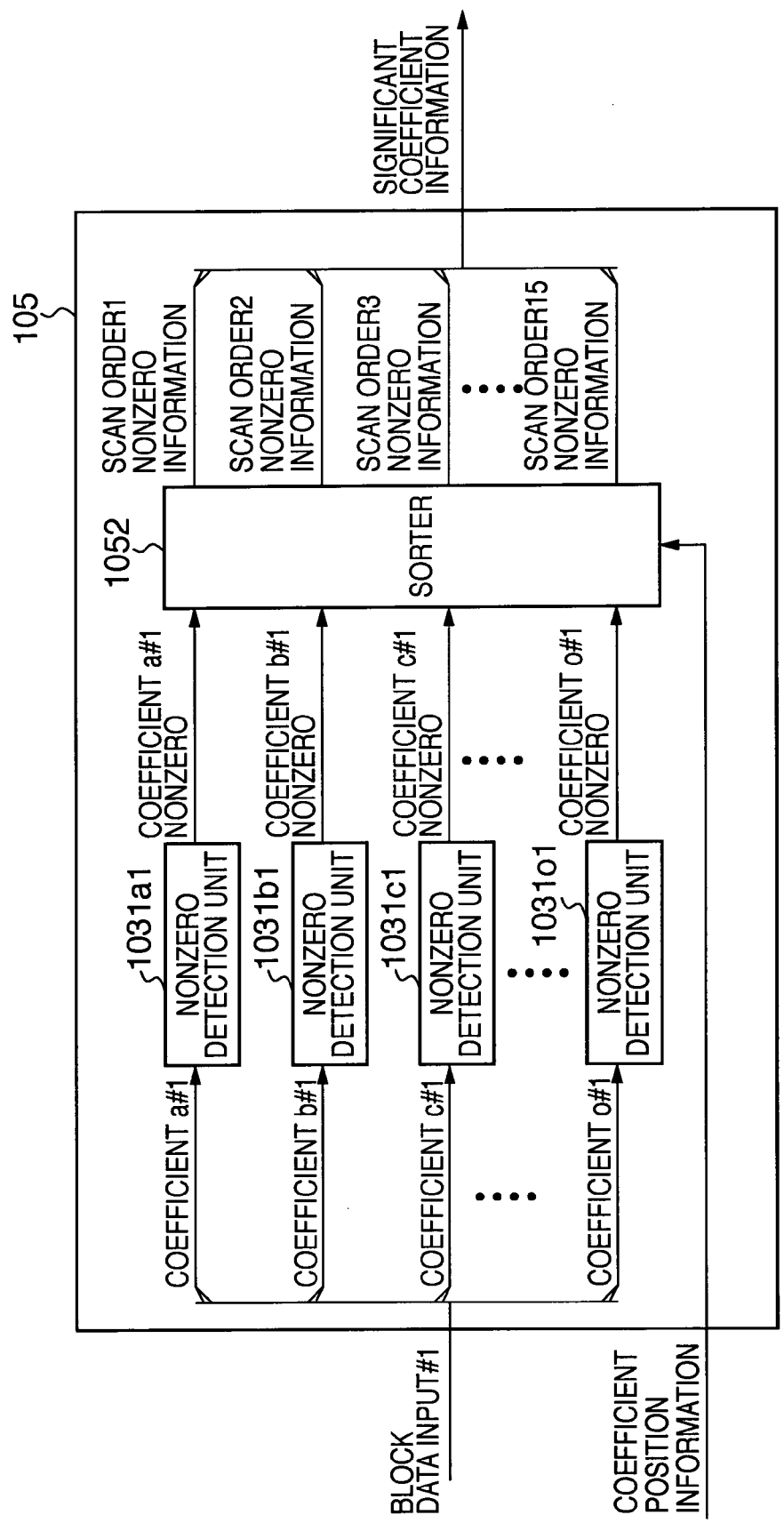
FIG. 15 is a block diagram showing the arrangement of a significant data position information generation unit.

The internal arrangement and operation of the significant data position information generation unit 105 will be described with reference to FIG. 15. Referring to FIG. 15, block data input #1 is split into coefficients a #1 to o #1, and the coefficients are input to nonzero detection units 1031a1 to 1031o1, respectively. The nonzero detection units 1031a1 to 1031o1 determine whether the coefficients a #1 to o #1 are 0, and output the determination results as the nonzero signals of the coefficients a #1 to o #1. In this embodiment, "1" is output as a nonzero signal representing nonzero. Otherwise, "0" is output. A sorter 1052 sorts the coefficients a #1 to o #1 based on scan orders 1 to 15 in accordance with the coefficient position information and outputs them as the nonzero information of scan orders 1 to 15. The pieces of nonzero information of scan orders 1 to 15 are output to the outside as significant coefficient information.

As described above, the scan conversion apparatus according to this embodiment performs, in scan conversion that adaptively updates the scan order, parallel processing based on significant data position information, thereby implementing high-speed scan conversion processing.

[Second Embodiment]

Figure 19:
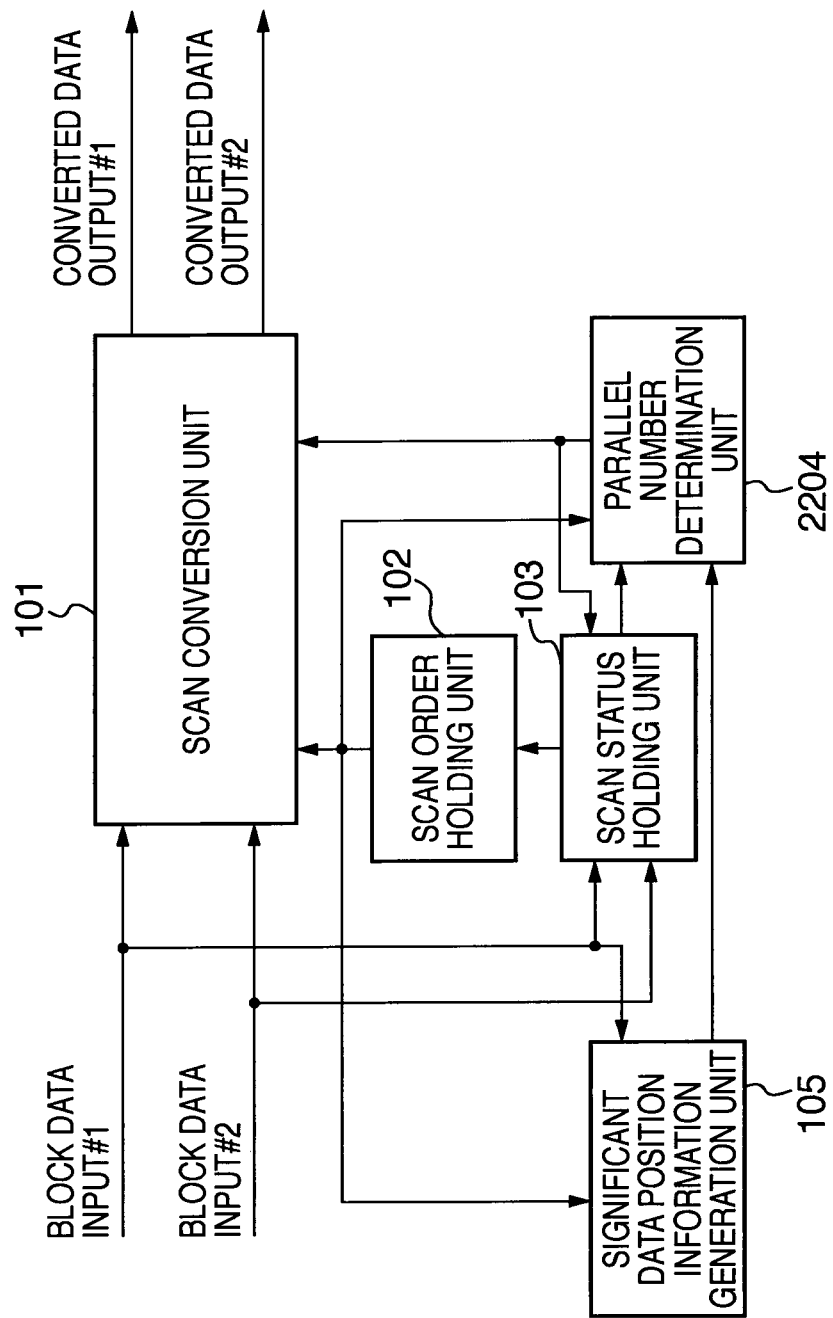
FIG. 19 is a block diagram showing the arrangement of a parallel scan conversion unit.

FIG. 19 shows the arrangement of a parallel scan conversion unit 206 according to the second embodiment. The parallel scan conversion unit 206 of the second embodiment has almost the same arrangement as in FIG. 1 except the connection relationship of several signal lines and the processing of a parallel number determination unit 2204. The remaining parts are the same as in FIG. 1, and a description thereof will not be repeated.

The operation of the parallel scan conversion unit 206 according to this embodiment will be described next with reference to FIGS. 19, 22, 23A and 23B. FIG. 22 shows changes in the statuses of the respective units from block data input to converted data output in periods of Terms 1 to 5. In Term 1, blocks A and B are respectively input as block data inputs #1 and #2 to each of a scan conversion unit 101 and a scan status holding unit 103. In Term 1, the block A is also input to a significant data position information generation unit 105. In Term 1, the scan order information held in a scan order holding unit 102 and the scan status held in the scan status holding unit 103 are in the initial status. The operations of the scan order holding unit 102 and the scan status holding unit 103 according to this embodiment and meanings of information handled in them are the same as those in the first embodiment, and a description thereof will not be repeated.

Figure 23B:
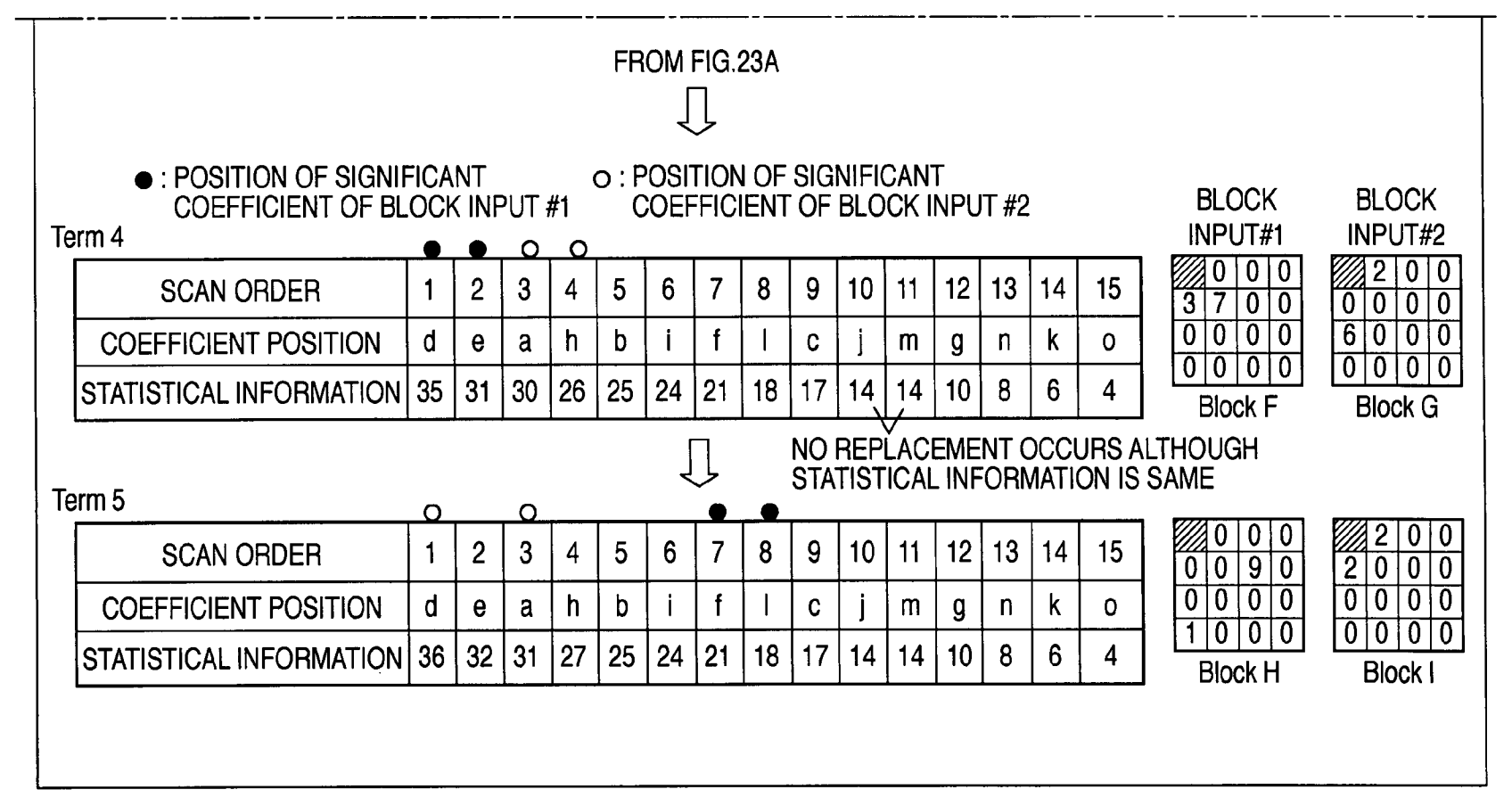

FIGS. 23A and 23B show the coefficient positions held in the scan order holding unit 102, the statistical information held in the scan status holding unit 103, and the statuses of block inputs #1 and #2 during the periods of Terms 1 to 5 in FIG. 22. In Term 1, the coefficient positions and statistical information are initialized as shown in FIG. 23A. Assume that the blocks A and B having values shown in FIG. 23A are input. In FIGS. 23A and 23B, coefficient positions corresponding to significant coefficients appearing in the input blocks are marked with full circles and open circles for the purpose of reference, as in FIGS. 18A and 18B. The meanings of full and open circles are the same as in FIGS. 18A and 18B. In the statistical information status of Term 1, the value of statistical information corresponding to each scan order never becomes larger than the value of statistical information corresponding to the preceding order independently of the positions of significant coefficients generated in the blocks. For this reason, both the blocks A and B can undergo scan conversion in the same scan order. In Term 1, the significant data position information generation unit 105 generates pieces of information each representing whether a corresponding coefficient in the block A is a significant coefficient, arranges them based on the scan order in accordance with the coefficient position information output from the scan order holding unit 102, and outputs the information to the parallel number determination unit 2204 as significant coefficient position information. Based on the coefficient position information output from the scan order holding unit 102, the statistical information output from the scan status holding unit 103, and the significant coefficient position information output from the significant data position information generation unit 105, the parallel number determination unit 2204 determines that parallel processing is possible, and outputs a signal representing a parallel process instruction to the scan conversion unit 101.

Figure 21:
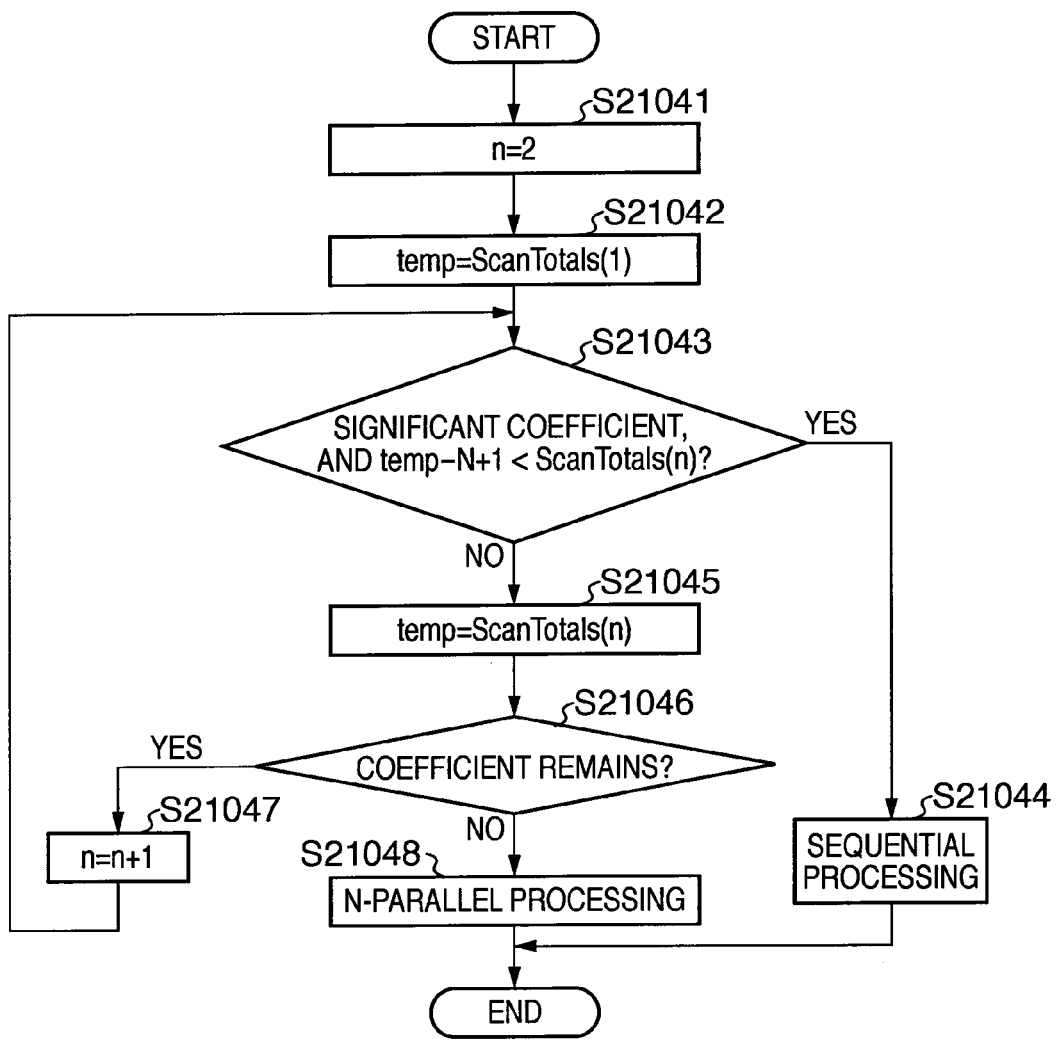
FIG. 21 is a flowchart showing the processing of the parallel number determination unit.

The processing procedure of parallel number determination of the parallel number determination unit 2204 will be described here with reference to FIG. 21. When processing starts, 2 is substituted into a variable n in process S22041. In process S22042, statistical information ScanTotals(1) corresponding to the first scan order is substituted into a variable temp. In determination process S22043, it is determined whether the coefficient of the nth scan order is a significant coefficient, and the value temp-N+1 is smaller than the value of statistical information ScanTotals(n) of the nth scan order. It can be understood that the latter, i.e., comparing temp-N+1 with ScanTotals(n) is equivalent to comparing statistical information ScanTotals(n) at the data position of interest with statistical information at the immediately preceding position. If these conditions are satisfied, the process advances to process S22044. Otherwise, the process advances to process S22045. N is the number of parallelly input blocks. In this embodiment, N=2. In process S22044, it is determined to perform sequential processing. When process S22044 has been done, the determination processing ends. When the statistical information ScanTotals(n) of the nth scan order is substituted into the variable temp in process S22045, process S22046 is executed. In process S22046, it is confirmed whether a coefficient still remains in the block. If a coefficient remains, the process advances to process S22047. Otherwise, the process advances to process S22048. In process S22047, the value of the variable n is incremented (increased), and the process returns to process S22043. In process S22048, it is determined to perform N-parallel processing. In this embodiment, since N=2, it is determined to perform 2-parallel processing. When process S22048 has been done, the determination processing ends. The parallel number determination unit 2204 thus generates parallel process control information based on the statistical information ScanTotals and the information representing whether a coefficient is a significant coefficient.

Referring back to Term 1, the scan conversion unit 101 sorts the scan orders of the input blocks A and B in Term 1 in accordance with the coefficient position information output from the scan order holding unit 102 and the parallel control signal output from the parallel number determination unit 2204. In Term 1, the parallel control signal output from the parallel number determination unit 2204 indicates parallel processing. Hence, the blocks A and B undergo sort processing in parallel in accordance with the coefficient position information output from the scan order holding unit 102.

In Term 2, blocks C and D are respectively input as block data inputs #1 and #2 to each of the scan conversion unit 101 and the scan status holding unit 103. In Term 2, the block C is also input to the significant data position information generation unit 105. Since parallel processing has been executed in Term 1, and the coefficients at the positions indicated by full and open circles in FIG. 23A are significant coefficients, the pieces of statistical information at the corresponding positions in the scan status holding unit 103 are updated to values as indicated by Term 2 in FIG. 23A. Since replacement of coefficient positions has not occurred upon inputting the blocks A and B, the coefficient position information in the scan order holding unit 102 does not change in Term 2. In Term 2, the significant data position information generation unit 105 generates pieces of information each representing whether a corresponding coefficient in the block C is a significant coefficient, arranges them based on the scan order in accordance with the coefficient position information output from the scan order holding unit 102, and outputs the information to the parallel number determination unit 2204 as significant coefficient position information. Based on the coefficient position information output from the scan order holding unit 102, the statistical information output from the scan status holding unit 103, and the significant coefficient position information output from the significant data position information generation unit 105, the parallel number determination unit 2204 outputs a parallel control signal to the scan conversion unit 101 and the scan status holding unit 103 in accordance with the procedure shown in FIG. 21. In Term 2, a portion where the scan orders replace each other exists, as indicated by Term 2 in FIG. 23A. Hence, the parallel number determination unit 2204 outputs a parallel control signal indicating sequential processing. In Term 2, since the parallel control signal indicates sequential processing, the scan status holding unit 103 updates, out of the pieces of currently held statistical information, only information corresponding to the significant coefficients of the input block C, and outputs the information to the scan order holding unit 102 as the next statistical information. The positions corresponding to the significant coefficients of the input block C to be updated are indicated by full circles in Term 2 of FIG. 23A. The scan order holding unit 102 decides the coefficient position information using the statistical information in the next status output from the scan status holding unit 103. In Term 2, the scan conversion unit 101 outputs the results of scan conversion processing of the blocks A and B in Term 1 as converted data outputs #1 and #2. Since the parallel control signal output from the parallel number determination unit 2204 indicates sequential processing, the scan conversion unit 101 sorts only the block C in accordance with the coefficient position information output from the scan order holding unit 102.

In Term 3, blocks D and E are respectively input as block data inputs #1 and #2 to each of the scan conversion unit 101 and the scan status holding unit 103. In Term 3, the block D is also input to the significant data position information generation unit 105. Since sequential processing has been executed in Term 2, and the coefficients at the positions indicated by full circles in FIG. 23A are significant coefficients of the block C, the pieces of statistical information at the corresponding positions in the scan status holding unit 103 are updated to values as indicated by Term 3 in FIG. 23A. Since replacement of coefficient positions has occurred upon inputting the block C, the coefficient position information in the scan order holding unit 102 is updated as indicated by Term 3 in FIG. 23A. In Term 3, the significant data position information generation unit 105 generates pieces of information each representing whether a corresponding coefficient in the block D is a significant coefficient, arranges them based on the scan order in accordance with the coefficient position information output from the scan order holding unit 102, and outputs the information to the parallel number determination unit 2204 as significant coefficient position information. In Term 3, no portion where the scan orders replace each other in the next status exists. Hence, the parallel number determination unit 2204 outputs a parallel control signal indicating parallel processing to the scan conversion unit 101 and the scan status holding unit 103 in accordance with the procedure shown in FIG. 21. In Term 3, since the parallel control signal indicates parallel processing, the scan status holding unit 103 updates, out of the pieces of currently held statistical information, information corresponding to the significant coefficients of the input blocks D and E, and outputs the information to the scan order holding unit 102 as the next statistical information. The positions corresponding to the significant coefficients of the input blocks D and E to be updated are indicated by full and open circles in Term 3 of FIG. 23A. The scan order holding unit 102 decides the coefficient position information using the statistical information in the next status output from the scan status holding unit 103. In Term 3, the scan conversion unit 101 outputs the result of scan conversion processing of the block C in Term 2 as converted data output #1. The scan conversion unit 101 also holds the result of the scan conversion processing of the block B and outputs it as converted data output #2. Since the parallel control signal output from the parallel number determination unit 2204 indicates parallel processing, the scan conversion unit 101 sorts the blocks D and E in parallel in accordance with the coefficient position information output from the scan order holding unit 102.

In Term 4, blocks F and G are respectively input as block data inputs #1 and #2 to each of the scan conversion unit 101 and the scan status holding unit 103. In Term 4, the block F is also input to the significant data position information generation unit 105. Since parallel processing has been executed in Term 3, and the coefficients at the positions indicated by full and open circles in FIG. 23A are significant coefficients, the pieces of statistical information at the corresponding positions in the scan status holding unit 103 are updated to values as indicated by Term 4 in FIG. 23B. Since replacement of coefficient positions has not occurred upon inputting the blocks D and E, the coefficient position information in the scan order holding unit 102 does not change in Term 4. In Term 4, the significant data position information generation unit 105 generates pieces of information each representing whether a corresponding coefficient in the block F is a significant coefficient, arranges them based on the scan order in accordance with the coefficient position information output from the scan order holding unit 102, and outputs the information to the parallel number determination unit 2204 as significant coefficient position information. Based on the coefficient position information output from the scan order holding unit 102 and the statistical information output from the scan status holding unit 103, the parallel number determination unit 2204 outputs a parallel control signal to the scan conversion unit 101 and the scan status holding unit 103 in accordance with the procedure shown in FIG. 21. In Term 4, although a portion with the same statistical information exists, the coefficients are not significant coefficients, as indicated by Term 4 in FIG. 23B. Hence, it is determined that no coefficient position replacement occurs, and the parallel number determination unit 2204 outputs a parallel control signal indicating parallel processing. In Term 4, since the parallel control signal indicates parallel processing, the scan status holding unit 103 updates, out of the pieces of currently held statistical information, information corresponding to the significant coefficients of the input blocks F and G, and outputs the information to the scan order holding unit 102 as the next statistical information. The positions corresponding to the significant coefficients of the input blocks F and G to be updated are indicated by full and open circles in Term 4 of FIG. 23B. The scan order holding unit 102 decides the coefficient position information using the statistical information in the next status output from the scan status holding unit 103. In Term 4, the scan conversion unit 101 outputs the results of scan conversion processing of the blocks D and E in Term 3 as converted data outputs #1 and #2. Since the parallel control signal output from the parallel number determination unit 2204 indicates parallel processing, the scan conversion unit 101 sorts the blocks F and G in parallel in accordance with the coefficient position information output from the scan order holding unit 102.

In Term 5, blocks H and I are respectively input as block data inputs #1 and #2 to each of the scan conversion unit 101 and the scan status holding unit 103. In Term 5, the block H is also input to the significant data position information generation unit 105. Since parallel processing has been executed in Term 4, and the coefficients at the positions indicated by full and open circles in FIG. 23B are significant coefficients, the pieces of statistical information at the corresponding positions in the scan status holding unit 103 are updated to values as indicated by Term 5 in FIG. 23B. Since replacement of coefficient positions has not occurred upon inputting the blocks F and G, the coefficient position information in the scan order holding unit 102 does not change in Term 5. In Term 5, the significant data position information generation unit 105 generates pieces of information each representing whether a corresponding coefficient in the block H is a significant coefficient, arranges them based on the scan order in accordance with the coefficient position information output from the scan order holding unit 102, and outputs the information to the parallel number determination unit 2204 as significant coefficient position information. In Term 5, no portion where the scan orders replace each other in the next status exists. Hence, the parallel number determination unit 2204 outputs a parallel control signal indicating parallel processing to the scan conversion unit 101 and the scan status holding unit 103 in accordance with the procedure shown in FIG. 21. In Term 5, since the parallel control signal indicates parallel processing, the scan status holding unit 103 updates, out of the pieces of currently held statistical information, information corresponding to the significant coefficients of the input blocks H and I, and outputs the information to the scan order holding unit 102 as the next statistical information. The positions corresponding to the significant coefficients of the input blocks H and I to be updated are indicated by full and open circles in Term 5 of FIG. 23B. The scan order holding unit 102 decides the coefficient position information using the statistical information in the next status output from the scan status holding unit 103. In Term 5, the scan conversion unit 101 outputs the result of scan conversion processing of the blocks F and G in Term 4 as converted data outputs #1 and #2. Since the parallel control signal output from the parallel number determination unit 2204 indicates parallel processing, the scan conversion unit 101 sorts the blocks H and I in parallel in accordance with the coefficient position information output from the scan order holding unit 102. The scan conversion processing is repeated in the same way.

Figure 20:
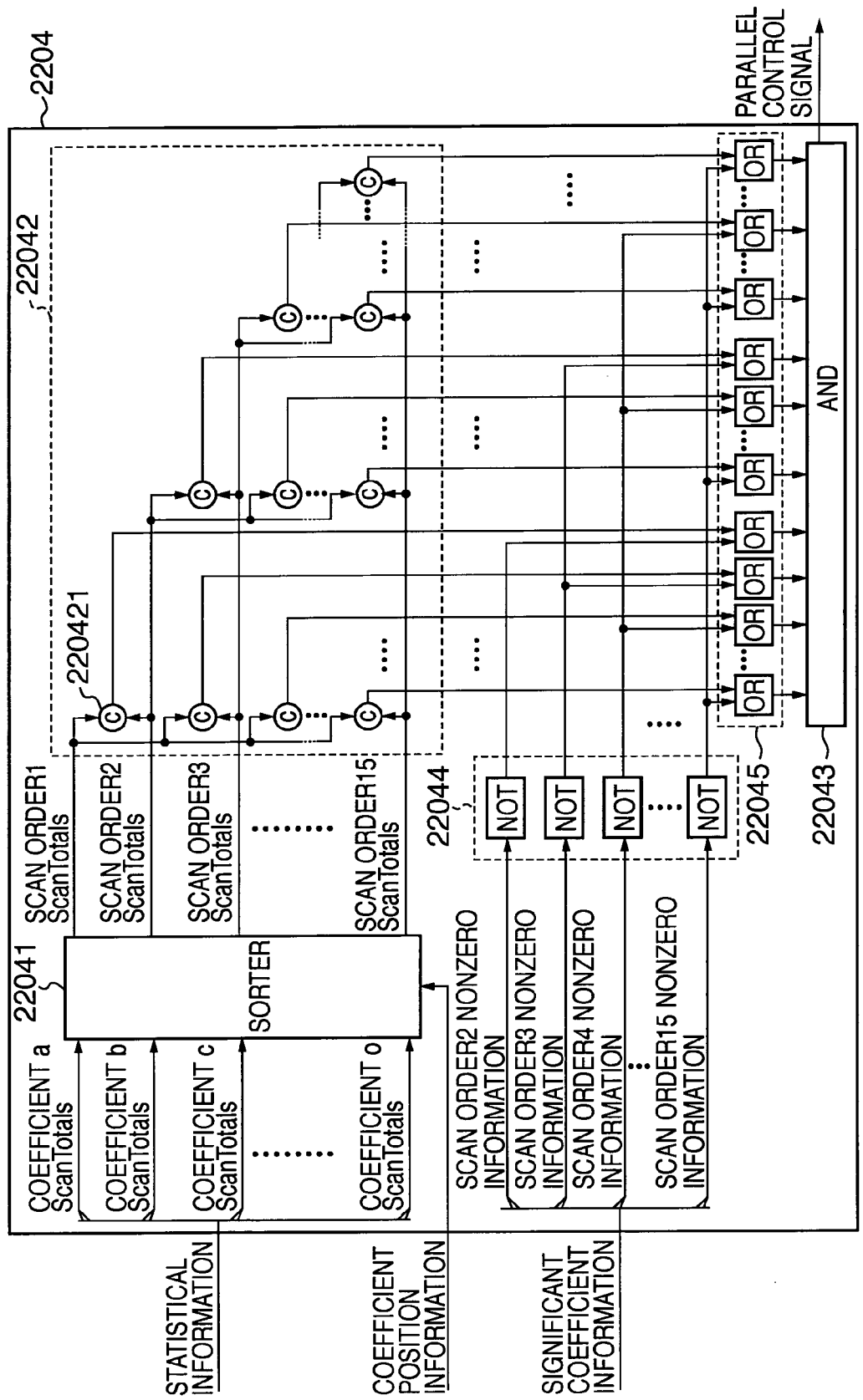
FIG. 20 is a block diagram showing the arrangement of a parallel number determination unit.

The arrangements and processes of the scan conversion unit 101, scan order holding unit 102, scan status holding unit 103, and significant data position information generation unit 105 according to the second embodiment are the same as in the first embodiment, and a description thereof will not be repeated. The arrangement and operation of the parallel number determination unit 2204 will be explained below with reference to FIG. 20. Referring to FIG. 20, input scan status information (statistical information) is split into ScanTotals of coefficients a to o and input to a sorter 22041. The sorter 22041 sorts the ScanTotals of the coefficients a to o in accordance with the coefficient position information based on scan orders 1 to 15 and outputs the ScanTotals to a comparison unit 22042. The comparison unit 22042 (including a plurality of comparators 220421) compares the ScanTotals of scan orders 1 to 15 and outputs the comparison result to an OR gate array 22045. The plurality of comparators 220421 in the comparison unit 22042 are connected to the OR gate array 22045 as illustrated. Each comparator 220421 outputs "0" if a value obtained by subtracting 1 from the input value from the upper side in FIG. 20 is smaller than the input value from the lower side, and otherwise, "1" to the OR gate array 22045 as a comparison result. The input significant coefficient information is split into nonzero information of scan orders 2 to 15 and input to a logic inverting gate 22044. The logic inverting gate 22044 logically inverts the nonzero information of scan orders 2 to 15 and outputs them to the OR gate array 22045. The OR gate array 22045 includes a plurality of logic OR gates which logically OR the comparison results from all comparators 220421 in the comparison unit 22042 and the logic inversion results of the nonzero information of scan orders 2 to 15 output from the logic inverting gate 22044, and output the logic ORs. A logic AND circuit 22043 logically ANDs all outputs from the OR gate array 22045 and outputs the logic AND to the outside as a parallel control signal. In this case, the parallel control signal indicates a parallel process instruction by "1" and a sequential process instruction by "0".

As described above, the scan conversion apparatus according to the second embodiment performs parallel processing based on significant data position information and the scan order in scan conversion more adaptive than in the first embodiment, thereby implementing high-speed scan conversion processing.

[Third Embodiment]

The arrangement and operation (process contents) of a parallel scan conversion unit 206 according to the third embodiment will be described next with reference to FIG. 24. The process contents of a parallel number determination unit 2804 are different from the second embodiment. The remaining constituent elements perform the same processes as in the second embodiment, and a description thereof will not be repeated.

The operation of the third embodiment will be explained with reference to FIGS. 24, 26, and 27A-27C. FIG. 26 shows changes in the statuses of the respective units from block data input to converted data output in periods of Terms 1 to 7. In Term 1, blocks A and B are respectively input as block data inputs #1 and #2 to each of a scan conversion unit 101 and a scan status holding unit 103. In Term 1, the block A is also input to a significant data position information generation unit 105. In Term 1, the scan order information held in a scan order holding unit 102 and the scan status held in the scan status holding unit 103 are in the initial status. The operations of the scan order holding unit 102 and the scan status holding unit 103 according to this embodiment and meanings of information handled in them are the same as those in the first embodiment, and a description thereof will not be repeated. FIGS. 27A to 27C show the coefficient positions held in the scan order holding unit 102, the statistical information held in the scan status holding unit 103, and the statuses of block inputs #1 and #2 during the periods of Terms 1 to 7 in FIG. 26. In Term 1, the coefficient positions and statistical information are initialized as shown in FIG. 26. Assume that the blocks A and B having values shown in FIG. 26 are input. In FIGS. 27A to 27C, coefficient positions corresponding to significant coefficients appearing in the input blocks are marked with full circles and open circles for the purpose of reference, as in FIGS. 18A and 18B. The meanings of full and open circles are the same as in FIGS. 18A and 18B. In Terms 1 to 5, the same processes as in the first embodiment are executed, and a description thereof will not be repeated. In Terms 1 to 5, no coefficient position replacement occurs. After the end of the processing in Terms 1 to 5, the coefficient positions and statistical information as indicated by Term 5 in FIG. 27B are obtained.

In Term 6, blocks F and G are respectively input as block data inputs #1 and #2 to each of the scan conversion unit 101 and the scan status holding unit 103. In Term 6, the block F is also input to the significant data position information generation unit 105. Since sequential processing has been executed in Term 5, and the coefficients at the positions indicated by full and open circles in FIG. 27B are significant coefficients, the pieces of statistical information at the corresponding positions in the scan status holding unit 103 are updated to values as indicated by Term 6 in FIG. 27C. Since replacement of coefficient positions has occurred upon inputting the block E, the coefficient position information in the scan order holding unit 102 is updated as indicated by Term 4 in FIG. 27B. In Term 6, the significant data position information generation unit 105 generates pieces of information each representing whether a corresponding coefficient in the block G is a significant coefficient, arranges them based on the scan order in accordance with the coefficient position information output from the scan order holding unit 102, and outputs the information to the parallel number determination unit 2804 as significant coefficient position information. In Term 6, although the significant coefficient position information coincides with a pattern shown in FIG. 16, as indicated by Term 4 in FIG. 27B, the parallel number determination unit 2804 outputs a parallel control signal indicating sequential processing to the scan conversion unit 101 and the scan status holding unit 103. This is because the statistical information of scan order 2 has a value larger than that of the statistical information of scan order 1. If the significant coefficients are located in accordance with a pattern shown in FIG. 16, but the statistical information of a scan order k+1 (k is an integer: k≥1) is larger than that of a scan order k, it is determined to execute sequential processing as exceptional processing. Hence, the parallel number determination unit 2804 outputs a parallel process control signal representing sequential processing as exceptional processing. Similarly in Term 6, since the parallel control signal indicates sequential processing, the scan status holding unit 103 updates, out of the pieces of currently held statistical information, only information corresponding to the significant coefficients of the input block F, and outputs the information to the scan order holding unit 102 as the next statistical information. The positions corresponding to the significant coefficients of the input block F to be updated are indicated by full circles in Term 6 of FIG. 27C. The scan order holding unit 102 decides the coefficient position information using the statistical information in the next status output from the scan status holding unit 103. In Term 6, the scan conversion unit 101 outputs the result of scan conversion processing of the block E in Term 5 as converted data output #1. Since the parallel control signal output from the parallel number determination unit 2804 indicates sequential processing, the scan conversion unit 101 sorts only the block F in accordance with the coefficient position information output from the scan order holding unit 102. The process in Term 7 is the same as in the first embodiment, and a description thereof will not be repeated. The scan conversion processing is repeated in the same way.

Figure 25:
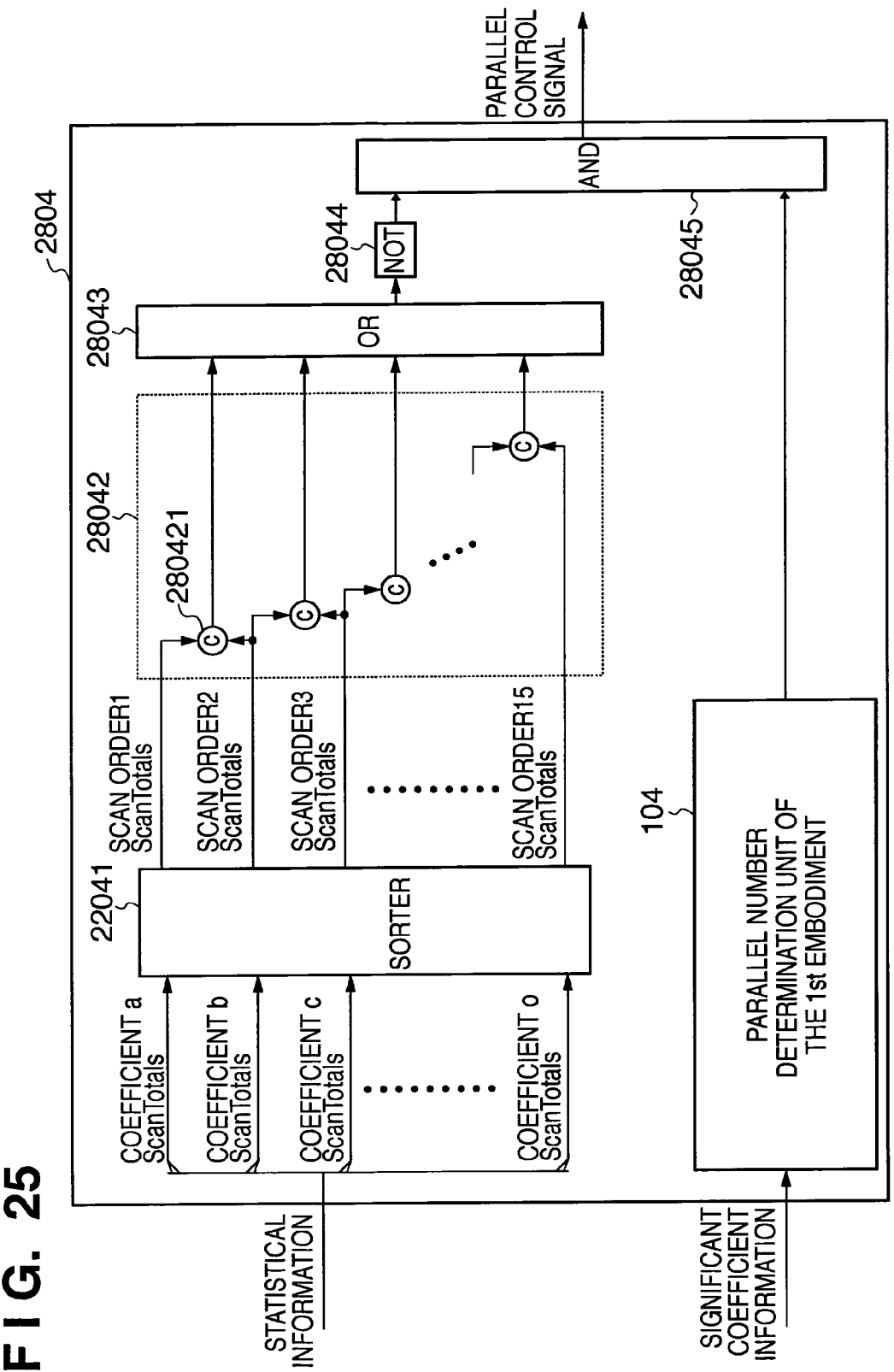
FIG. 25 is a block diagram showing the arrangement of a parallel number determination unit.

The internal arrangement and operation of the parallel number determination unit 2804 according to the third embodiment will be explained next with reference to FIG. 25. Input statistical information is split into ScanTotals of coefficients a to o and input to a sorter 22041. The sorter 22041 sorts the ScanTotals of the coefficients a to o in accordance with the coefficient position information based on scan orders 1 to 15 and outputs the ScanTotals to a comparison unit 28042. The comparison unit 28042 compares the ScanTotals of scan orders 1 to 15 and outputs the comparison result to an OR gate 28043. The comparison unit 28042 includes a plurality of comparators 280421 connected as illustrated. Each comparator 280421 outputs "0" if the input value from the upper side in FIG. 25 is larger than the input value from the lower side, and otherwise, "1" to the logic OR gate 28043 as a comparison result. The logic OR gate 28043 calculates the logical OR of the comparison results from the comparison unit 28042, and outputs it to a logic NOT gate 28044. The logic NOT gate 28044 logically inverts the input from the logic OR gate 28043 and outputs it to a logic AND gate 28045. The logic AND gate 28045 calculates the logic AND of the input from the parallel number determination unit 104 and the input from the logic NOT gate 28044, and outputs it to the outside as a parallel control signal. In this case, the parallel control signal indicates a parallel process instruction by "1" and a sequential process instruction by "0".

As described above, the scan conversion apparatus according to the third embodiment performs parallel processing based on significant data position information and the scan order in adaptive scan conversion, thereby implementing high-speed scan conversion processing. In the embodiments, the pieces of statistical information ScanTotals( ) and the coefficient positions ScanOrder( ) are managed in separate tables, as shown in FIGS. 7A and 7B. However, they may be managed in a single table because a piece of statistical information and a coefficient position are handled as a pair. In the above-described embodiments, the apparatus of the present invention is accommodated in an encoder incorporated in a camera. However, the present invention is not limited to this.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-069012, filed Mar. 19, 2009, which is hereby incorporated by reference herein in its entirety.

The invention claimed is:

1. A method of controlling a scan conversion apparatus for sorting data in a block having n rows ×m columns based on a predetermined scan order, comprising:
   a scan status holding step of updating and holding a current scan status in accordance with a status of the data in the block;
   a scan order holding step of updating and holding a scan order in accordance with the scan status;
   a significant data position information generation step of generating position information of significant data that exists in the block;
   a parallel number determination step of instructing to perform scan conversion processing of N (N is an integer: N≥2) blocks as M-parallel processing (M is an integer: 1≤M≤N) in accordance with the position information output in the significant data position information generation step; and
   a scan conversion step of sorting, in accordance with the instruction in the parallel number determination step, the data in the block based on the scan order held in the scan order holding step.

2. The method according to claim 1, wherein in the parallel number determination step, it is instructed to perform scan conversion processing of the N blocks as M-parallel processing in accordance with the scan status and the position information.

3. The method according to claim 2, wherein in the parallel number determination step, when at least one of
   condition 1: none of data in the block are significant data, and
   condition 2: significant data exist without interruption from a scan order i (i is an integer: 1≤i) to a scan order i+j (j is an integer: 0≤j) corresponding to the position information, and no significant data exists from a scan order i+j+1 is satisfied, it is instructed to perform scan conversion processing of the N blocks as M-parallel processing, and if neither of condition 1 and condition 2 is satisfied, it is instructed to execute one scan conversion process.

4. The method according to claim 2, wherein in the parallel number determination step, it is determined, based on a difference between a scan status of the scan order i (i is an integer: 1≤i) and a scan status of the scan order i+1, and nonzero/zero of the scan order i+1, whether parallel processing of scan conversion processing of the N blocks is executable.

5. A method of controlling an image encoding apparatus, comprising:
   an image dividing step of dividing an image into unit blocks each having n rows×m columns;

an orthogonal transform step of performing orthogonal transform of each unit block output in the image dividing step and outputting transform coefficients;

a quantization step of quantizing the transform coefficients output in the orthogonal transform step and outputting quantized transform coefficients;

a parallel scan conversion step of sorting the quantized transform coefficients output in the quantization step in each unit block and outputting the quantized transform coefficients; and an entropy encoding step of entropy-encoding the quantized transform coefficients output in the parallel scan conversion step and outputting a code stream, the parallel scan conversion step comprising:

a scan status holding step of updating and holding a current scan status in accordance with a status of the data in the block;

a scan order holding step of updating and holding a scan order in accordance with the scan status;

a significant data position information generation step of generating position information of significant data that exists in the block;

a parallel number determination step of instructing to perform scan conversion processing of N (N is an integer: N≥2) blocks as M-parallel processing (M is an integer: 1≤M≤N) in accordance with the position information output in the significant data position information generation step; and a scan conversion step of sorting, in accordance with the instruction in the parallel number determination step, the data in the block based on the scan order held in the scan order holding step.

6. A method of controlling a scan conversion apparatus which includes a plurality of scan conversion units, each scan conversion unit constructed to sequentially read out and to output data in two-dimensionally arrayed blocks in an order of data positions based on sorting information, and if the readout data is nonzero, to increase an appearance frequency value at the position of the data, and to scan the data in the two-dimensionally arrayed blocks to convert the data into one-dimensionally arrayed data for run-length encoding, comprising:

a setting step of setting initial sorting information in which positions of data in the two-dimensional arrayed scan target blocks and statistical appearance frequency values of nonzero at the data positions are paired, and the pairs are arranged in descending order of appearance frequency value;

an information generation step of scanning, based on the sorting information, data in blocks of two-dimensionally arrayed data that is a scan target of one of the plurality of scan conversion units, and generating information representing nonzero/zero for each data; and a control step of controlling, based on the information generated in the information generation step and representing nonzero/zero, whether to allow execution of parallel processing of the plurality of scan conversion units.

7. A scan conversion apparatus for sorting data in a block having n rows ×m columns based on a predetermined scan order, comprising:

a scan status holding unit constructed to update and to hold a current scan status in accordance with a status of the data in the block;

a scan order holding unit constructed to update and to hold a scan order in accordance with the scan status;

a significant data position information generation unit constructed to generate position information of significant data that exists in the block;

a parallel number determination unit constructed to instruct to perform scan conversion processing of N (N is an integer: N≥2) blocks as M-parallel processing (M is an integer: 1≤M≤N) in accordance with the position information output from the significant data position information generation unit; and a scan conversion unit constructed to sort, in accordance with the instruction from the parallel number determination unit, the data in the block based on the scan order held by the scan order holding unit.

8. The apparatus according to claim 7, wherein the parallel number determination unit instructs to perform scan conversion processing of the N blocks as M-parallel processing in accordance with the scan status and the position information.

9. The apparatus according to claim 8, wherein when at least one of condition 1: none of data in the block are significant data, and condition 2: significant data exist without interruption from a scan order i (i is an integer: 1≤i) to a scan order i+j (j is an integer: 0≤j) corresponding to the position information, and no significant data exists from a scan order i+j+1 is satisfied, the parallel number determination unit instructs to perform scan conversion processing of the N blocks as M-parallel processing, and if neither of condition 1 and condition 2 is satisfied, the parallel number determination unit instructs to execute one scan conversion unit.

10. The apparatus according to claim 7, wherein based on a difference between a scan status of a scan order i (i is an integer: 1≤i) and a scan status of a scan order i+1, and nonzero/zero of the scan order i+1, the parallel number determination unit determines whether parallel processing of the N blocks is executable by the scan conversion unit.

11. An image encoding apparatus comprising:

an image dividing unit constructed to divide an image into unit blocks each having n rows×m columns;

an orthogonal transform unit constructed to perform orthogonal transform of each unit block output from the image dividing unit and to output transform coefficients;

a quantization unit constructed to quantize the transform coefficients output from the orthogonal transform unit and to output quantized transform coefficients;

a parallel scan conversion unit constructed to sort the quantized transform coefficients output from the quantization unit in each unit block and to output the quantized transform coefficients; and an entropy encoding unit constructed to entropy-encode the quantized transform coefficients output from the parallel scan conversion unit and to output a code stream, wherein the parallel scan conversion unit comprises:

a scan status holding unit constructed to update and to hold a current scan status in accordance with a status of the data in the block;

a scan order holding unit constructed to update and to hold a scan order in accordance with the scan status;

a significant data position information generation unit constructed to generate position information of significant data that exists in the block;

a parallel number determination unit constructed to instruct to perform scan conversion processing of N (N is an integer: N≥2) blocks as M-parallel processing (M is an integer: 1≤M≤N) in accordance with the position information output from the significant data position information generation unit; and a scan conversion unit constructed to sort, in accordance with the instruction from the parallel number determination unit, the data in the block based on the scan order held by the scan order holding unit.

12. A scan conversion apparatus which scans data in two-dimensionally arrayed blocks to convert the data into one-dimensionally arrayed data for run-length encoding, comprising:
- a setting unit constructed to set initial sorting information in which positions of data in the two-dimensional arrayed scan target blocks and statistical appearance frequency values of nonzero at the data positions are paired, and the pairs are arranged in descending order of appearance frequency value;
- a plurality of scan conversion units, each scan conversion unit constructed to sequentially read out and to output the data in the two-dimensionally arrayed blocks in an order of data positions based on the sorting information, and if the readout data is nonzero, to increase the appearance frequency value at the position of the data;
- an information generation unit constructed to scan, based on the sorting information, data in blocks of two-dimensionally arrayed data that is a scan target of one of the plurality of scan conversion units, and to generate information representing nonzero/zero for each data; and
- a control unit constructed to control, based on the information generated by the information generation unit and representing nonzero/zero, whether to allow execution of parallel processing of the plurality of scan conversion units.

13. The apparatus according to claim 12, wherein when at least one of
- condition 1: all scan target data in a block are zero, and
- condition 2: nonzero exists at a scan start position according to the sorting information, and a change from zero to nonzero never occurs up to a scan end position is satisfied, the control unit executes the plurality of scan conversion units in parallel, and if neither of condition 1 and condition 2 is satisfied, the control unit executes one scan conversion unit.

14. The apparatus according to claim 12, wherein based on a difference between an appearance frequency value at a position of data of interest represented by the sorting information and an appearance frequency of a position of immediately preceding data, and nonzero/zero of the data of interest, the control unit controls whether to allow execution of parallel processing of the plurality of scan conversion units.

15. An image encoding apparatus for encoding image data, comprising:
- a dividing unit constructed to divide encoding target image data into unit blocks each having m×n pixels;
- an orthogonal transform unit constructed to perform orthogonal transform of each unit block divided by the dividing unit and to output transform coefficients;
- a quantization unit constructed to quantize the transform coefficients obtained by the orthogonal transform unit;
- a scan conversion apparatus of claim 7, which is constructed to convert data of the unit block representing the quantized transform coefficients into one-dimensional data; and
- a run-length encoding unit constructed to perform run-length encoding of the data obtained by the scan conversion apparatus and to output the data.

* * * * *